US011852764B2

(12) United States Patent
Hayward

(10) Patent No.: US 11,852,764 B2
(45) Date of Patent: Dec. 26, 2023

(54) SEISMIC DETECTION SWITCH

(71) Applicant: Triad National Security, LLC, Los Alamos, NM (US)

(72) Inventor: Allen D. Hayward, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 907 days.

(21) Appl. No.: 16/522,916

(22) Filed: Jul. 26, 2019

(65) Prior Publication Data

US 2020/0088893 A1    Mar. 19, 2020

Related U.S. Application Data

(60) Provisional application No. 62/703,915, filed on Jul. 27, 2018.

(51) Int. Cl.
| | | |
|---|---|---|
| *G01V 1/16* | (2006.01) | |
| *G01V 1/28* | (2006.01) | |
| *G01V 1/00* | (2006.01) | |
| *G01V 1/18* | (2006.01) | |
| G08B 5/22 | (2006.01) | |
| G01V 1/22 | (2006.01) | |
| G01K 1/02 | (2021.01) | |
| G01K 13/00 | (2021.01) | |

(52) U.S. Cl.
CPC .............. *G01V 1/164* (2013.01); *G01V 1/008* (2013.01); *G01V 1/181* (2013.01); *G01V 1/28* (2013.01); *G01K 1/02* (2013.01); *G01K 13/00* (2013.01); *G01V 1/226* (2013.01); *G01V 2210/14* (2013.01); *G01V 2210/72* (2013.01); *G08B 5/22* (2013.01)

(58) Field of Classification Search
CPC ........ G01V 1/164; G01V 1/008; G01V 1/181; G01V 1/28; G01V 2210/14
See application file for complete search history.

(56) References Cited

U.S. PATENT DOCUMENTS

| | | | | |
|---|---|---|---|---|
| 5,309,149 A | * | 5/1994 | Bozeman, Jr. ....... | G08B 21/187 340/683 |
| 5,420,380 A | * | 5/1995 | Harben ................. | G08B 21/10 340/690 |

(Continued)

OTHER PUBLICATIONS

Somula et al, "Reliability prediction of seismic switch for early detection of earthquakes around NPPs". International Journal of System Assurance Engineering and Management. 7. 10.1007/s13 (Year: 2016).*

(Continued)

*Primary Examiner* — Ian J Lobo

(57) ABSTRACT

A seismic switch (SS) that is able to detect and signal when internal faults have occurred within the SS is described. The SS provides safety class functionality to the detection of seismic activity. For example, the SS may detect earthquakes above a specified level, resulting in the disconnection of electrical power to a radioactive waste storage facility, which could result in the ignition of waste materials should the storage facility and/or storage container fail during a seismic event. By reducing the risk of fire under these circumstances, the possibility of offsite releases is significantly reduced.

20 Claims, 17 Drawing Sheets

(56) References Cited

U.S. PATENT DOCUMENTS

| | | | | |
|---|---|---|---|---|
| 7,042,365 B1 * | 5/2006 | Diaz-Lopez | ............ | G01V 1/008 340/521 |
| 7,375,646 B1 * | 5/2008 | Diaz-Lopez | ............ | G08B 21/10 367/13 |
| 2009/0217092 A1 * | 8/2009 | Weiberle | ............... | G06F 11/165 714/24 |

OTHER PUBLICATIONS

"Lockstep Analysis for Safety—Critical Embedded Systems" Stylianos Ganitis Aalborg University Student Report, Aug. 1, 2015 pp. 1-133.

* cited by examiner

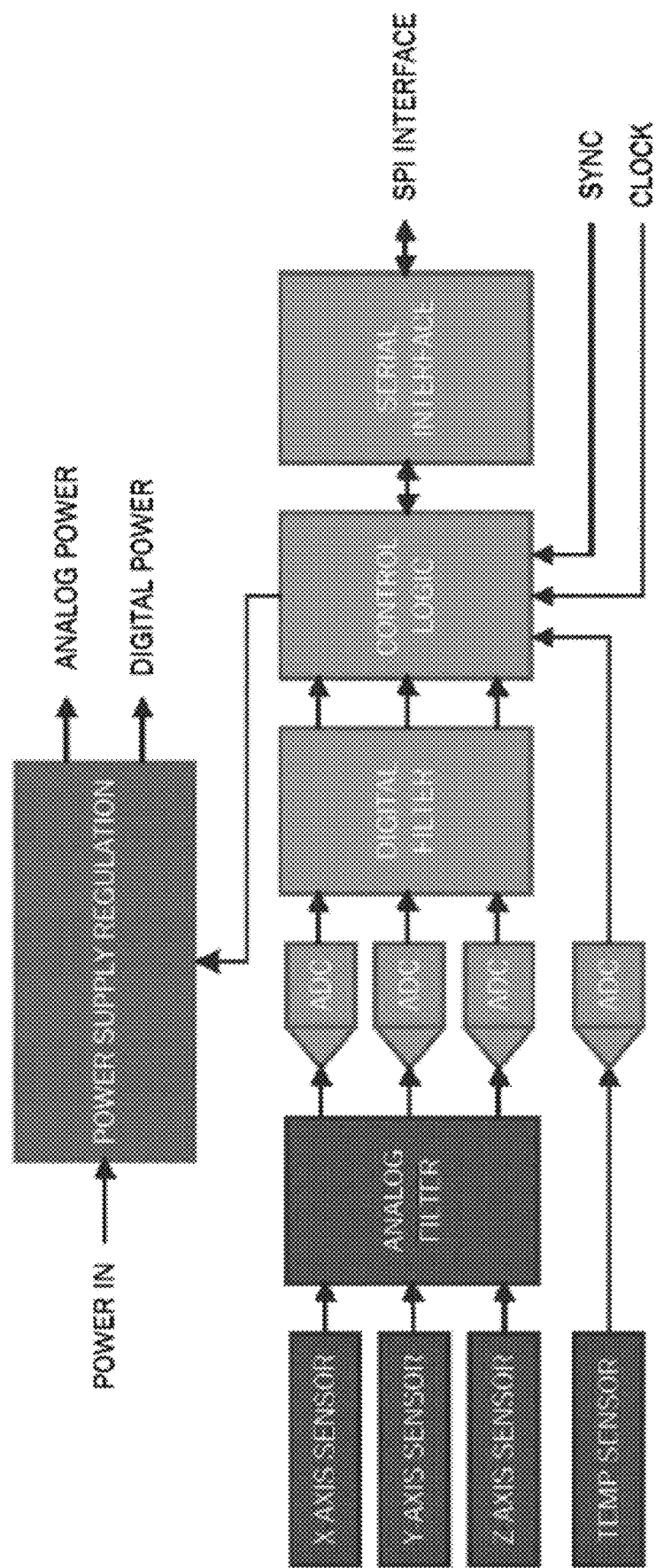
FIG. 3
Replacement Sheet

SEISMIC DETECTION SWITCH

CROSS-REFERENCE TO RELATED APPLICATION

This application claims the benefit of priority of U.S. Provisional Patent Application No. 62/703,915, filed on Jul. 27, 2018, and titled "SEISMIC DETECTION SWITCH," the contents of which is expressly incorporated herein by reference in its entirety.

STATEMENT REGARDING FEDERALLY SPONSORED RESEARCH OR DEVELOPMENT

The United States government has rights in this invention pursuant to Contract No. 89233218CNA000001 between the United States Department of Energy (DOE), the National Nuclear Security Administration (NNSA), and Triad National Security, LLC for the operation of Los Alamos National Laboratory.

BACKGROUND

Seismic switches are configured to detect seismic activity. Present seismic switches may not detect at least some dangerous faults.

SUMMARY

Teachings of the present disclosure improve present seismic switches by reducing the number of undetectable dangerous faults to nearly zero.

The present disclosure provides a seismic switch (SS) that is able to detect and signal when internal faults have occurred within the SS. The SS includes software contained within a microcontroller unit (MCU) of the SS. The MCU is a main processor integrated circuit that includes central processing units (CPUs), flash memory, random access memory (RAM), and multiple peripherals. The MCU also includes specific hardware to detect internal faults of the MCU.

The SS provides safety class functionality to the detection of seismic activity. For example, the SS may detect earthquakes above a specified level, resulting in the disconnection of electrical power to a radioactive waste storage facility, which could result in the ignition of waste materials should the storage facility and/or storage container fail during a seismic event. By reducing the risk of fire under these circumstances, the possibility of offsite releases is significantly reduced. Notwithstanding the foregoing, the SS of the present disclosure is useful for any application that requires a high reliability detection of seismic activity.

A seismic detection sensor may "quietly" operate for a significant amount, or entire duration, of the sensor's lifetime. Thus, a seismic detection sensor may have an increased chance of malfunctioning with no indication of failure until the sensor is called upon during a real seismic event. The SS of the present disclosure is configured with internal fault detection to ensure SS availability, during a real seismic event, without undue burden do to routine operational checks. This results in increased reliability at a reduced operating cost.

The SS of the present disclosure may include a single enclosure measuring approximately 6"×5.5"×2.5". The enclosure may be made of aluminum or another solid material. Mil-spec electrical connectors may be used to provide power, communications, and output relay connections to external devices. A fiber optic ST type connector may provide a transmit only port, which can be used to report the SS's status to a remote display, referred to as a Seismic Switch Remote Status (SSRS) display.

The SS may include a Texas Instruments R48 series MCU designed for safety applications, which may be paired with a Texas Instruments TPS65381A power supply/regulator. Three tri-axial MEMS accelerometers may be used to detect seismic activity by measuring g-forces applied to the SS. Three accelerometers are provided for redundancy, which provides additional system reliability. Additional circuits may be provided to drive optically isolated relay outputs, serial ports, and indicator lights.

The software provided in the SS may run a deterministic Real Time Operating System (RTOS) that guarantees safety functions are completed in a timely manner prior to performing non-safety functions. The SS may be configured to use minimal interrupts to assure deterministic operations. Interrupts are limited to specific hardware error conditions that should be handled as soon as possible to prevent system upset. Four modes of operation for the RTOS are provided: a normal safety mode, a service mode, a startup mode, and a fail-safe mode.

The SS of the present disclosure has two safety related functions. One safety related function of the SS is to detect ground accelerations caused by seismic activity in a specified frequency band and trigger an output seismic relay to open when the detected activity is at or above a specified set point. The other safety related function is to detect faults within the SS that prevent it from performing the foregoing safety related function and trigger an output fault relay to open, indicating the SS is unable to perform the aforementioned safety function.

The SS of the present disclosure has several non-safety related functions. The software and the hardware of the SS is configured to prevent the software from impacting the SS's ability to perform the aforementioned safety functions. The software and hardware of the present disclosure provides a redundant path to a failsafe mode for failures that the SS is unable to automatically recover from.

One non-safety related function of the SS is to continually report the status of internal operations via a fiber optics transmitter to a SSRS display. The status may include things such as voltages, temperature, relay status, system mode, and current g-forces applied.

Another non-safety related function of the SS is to provide a local serial port for use in testing and configuring the SS. The serial port may be password protected to prevent unauthorized access to the SS and its settings.

A further non-safety related function of the SS is to provide local indicator lights to display the current status of the SS. Such indicator lights may represent statuses such as normal operations, fault, tripped, and service mode.

Yet another non-safety related function of the SS is to provide an input that allows remote resetting of a seismic trip event. This input may be edge triggered to prevent a continual reset input signal from preventing a seismic trip.

Another non-safety related function of the SS is to monitor internal signals for non-safety related fault conditions (e.g., conditions that are incorrect, but do not impact the safety functions of the SS).

The above safety and non-safety related functions are illustrative. Thus, one skilled in the art will appreciate additional safety and non-safety related functions of the SS not explicitly described above.

BRIEF DESCRIPTION OF DRAWINGS

For a more complete understanding of the present disclosure, reference is now made to the following description taken in conjunction with the accompanying drawings.

FIG. 3 illustrates an accelerometer internal architecture according to embodiments of the present disclosure.

DETAILED DESCRIPTION

Overview

The following describes aspects of a seismic switch in which a safety processor (having the ability to detect operational failure in real time) may communicate with one or more accelerometers using onboard communication protocols, such as through serial peripheral interfaces (SPIs) and/or I2C. However, the scope of the present disclosure is not limited to a seismic switch. That is, the teachings herein of implementing a safety processor in a seismic switch may be used to configure a safety processor for implementation in a variety of industrial sensors whereby the safety processor may communicate with one or more industrial sensors through onboard communication protocols or analog communications. For example, the teachings herein could be used to configure a safety processor to communicate with one or more pressure transmitters, one or more temperature transmitters, one or more humidity transmitters, and/or one or more other measurement transmitters.

Hardware

Microcontroller Unit (MCU)

Figure 1:
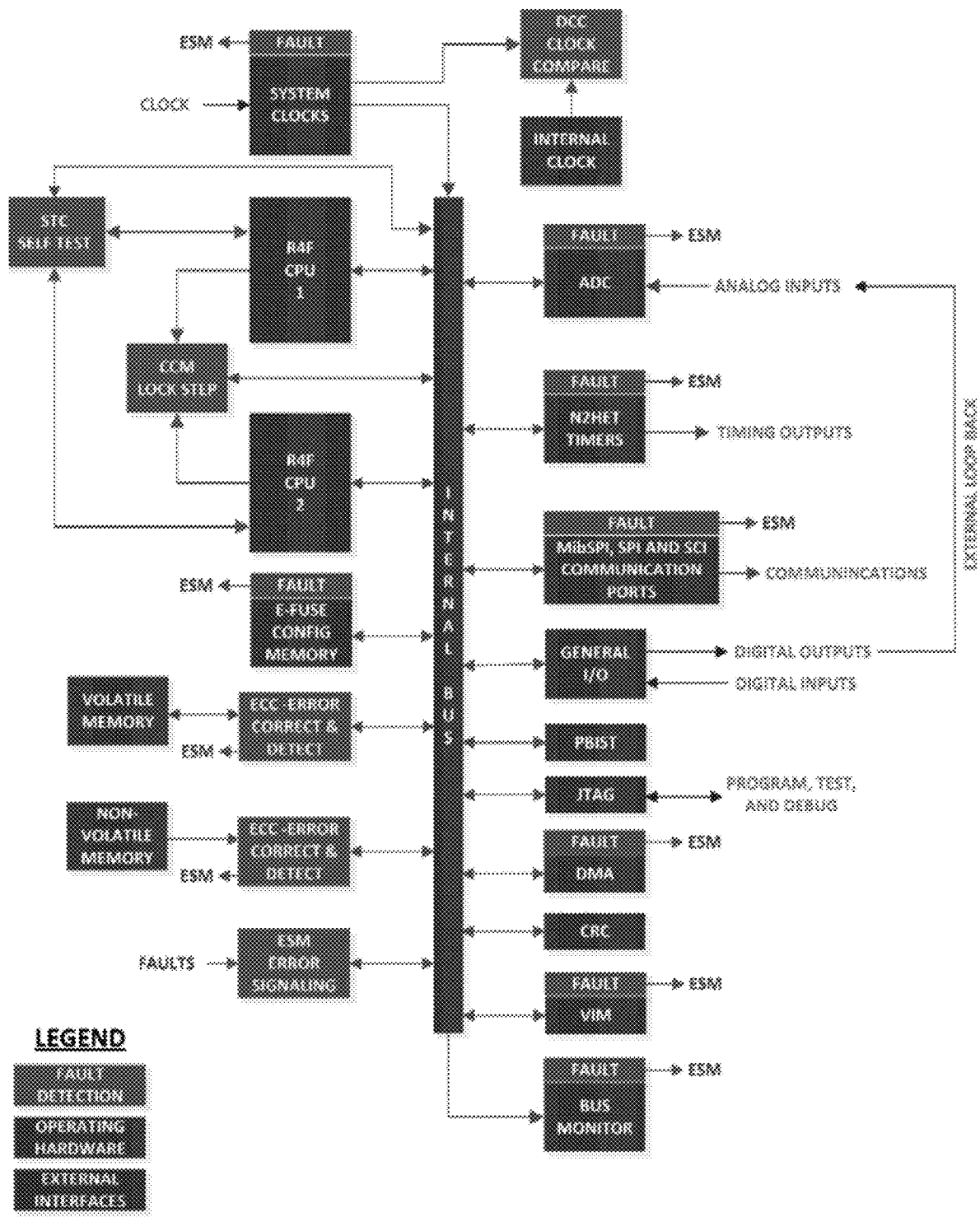
FIG. 1 illustrates a microcontroller unit (MCU) architecture of a seismic switch (SS) according to embodiments of the present disclosure.

A seismic switch (SS) according to the present disclosure may include a significantly integrated hardware and software design. Many functions may be provided by on-board microcontroller unit (MCU) hardware peripherals (as illustrated in FIG. 1).

The MCU may control function processing of the SS. The MCU may also be configured with several peripherals to interface with other parts of the SS's hardware. Details of each peripheral of the MCU may be found in Texas Instruments (TI) data sheets. TI data sheet "SPNS177D-RM78L952 16- and 32-Bit RISC Flash Micro Controller," revised June 2015, provides general details on various peripherals, memory sizes, processor details, and features for a MCU that may be incorporated into an SS according to the present disclosure. TI data sheet "SPNU503B-RM48x 16/32-Bit RISC Flash Microcontroller Technical Reference Manual," revised August 2013, provides details for various MCU peripherals, but doesn't specify which or how many of any given peripheral is available on a MCU of the present disclosure. The two aforementioned TI data sheets may thus be used together to get a complete understanding of capabilities of a MCU of the present disclosure. A RM48 series MCU may be used due to its extensive internal fault detection and correction capabilities.

The RM48 series MCU uses a dual ARM Cortex-R4F CPU. Unlike traditional multi-CPU processors that allow each CPU to process separate data to increase throughput, the CPUs in a MCU of the present disclosure may be operated in lockstep, processing identical data at all times. An on-chip supervisory system may assure the processing in both CPUs is identical at all times. If a discrepancy occurs between the processors, the system may flag the error and attempt a recovery, or may be locked into a safety shutdown mode.

Memory (e.g., FLASH and RAM) within the MCU may be protected using a real-time fault detection and correction system. The system can detect a single bit fault, correct it, and inform the error monitoring system of the location of the fault. Faults of 2 or more bits may not be corrected, but may be sent to the error monitoring system for handling.

The MCU may include a vectored interrupt component (VIM). The VIM may be used to control interrupts to the CPU. Per IEEE 7.4.3.2, the use of interrupts should be limited in safety related control systems. In the software implemented in an SS of the present disclosure, the interrupts may be limited to specific hardware fault related interrupts. Interrupts from both on-board and off-board communications may not be allowed.

The MCU may include an error signaling component (ESM). The ESM may be used to communicate hardware detected faults to the CPU and externally via an ERROR pin to a power supply controller. ESM may also be used to check for proper callbacks after simulated faults are injected into system fault detection circuitry.

The MCU may include a real-time interrupt component (RTI). The RTI provides real-time signals that may be used in software of the SS to ensure timing of critical operations is maintained. The RTI can be used to generate interrupts to the CPU or may be used in a polling type method. To reduce possible interrupt overload to the CPU, the polling method may be used in the SS's software. The RTI may use two channels, one to produce a 400 Hz RTOS timing and another to produce a 1 Hz refresh timing for remote status updates.

The MCU may include a cyclic redundancy check controller component (CRC). The CRC is a hardware implementation of a CRC calculation code. The CRC may be used to calculate CRC values for specified memory locations to validate content is correct. The CRC may be used by the SS's software to validate flash (e.g., program) memory is not corrupted. The CRC may also be used to calculate CRC values for packets of data sent to a Seismic Switch Remote Status (SSRS) display and to validate system settings retrieved from non-volatile memory.

The MCU may include a direct access memory controller component (DMA). The DMA may allow for transfer of data to and from memory to other memory locations or to peripherals of the MCU without the use of CPU program cycles. In the SS's software, the DMA may be used to move memory data to the CRC for verification and to transmit status data via a fiber optics port with minimal oversight from the CPU.

The MCU may include an analog-to-digital converter component (ADC). The ADC converts analog signals to digital values for use within the MCU. The ADC may provide a 12 bit converter resolution and semi-autonomist operations, being able to do several input conversions at one time with minimal CPU overhead. In the SS, the ADC may be used to convert power supply voltages and relay drive currents into digital values used for fault detection.

The MCU may include a high end timer component (N2HET). The N2HET is used in the CPU for critical timing functions. The N2HET may be a separate sub-processor within the MCU that utilizes a special command instruction set specifically designed for timing applications. In the SS, the N2HET may be used to provide a 10 Hz calibration signal output and clocking signals for accelerometers.

The MCU may include a general purpose input/output component (GIO). The GIO controls general purpose input and output pins on the MCU. In the SS, the general purpose pins may be used to drive output relays, drive indicator lights, to receive a trip reset signal, and to drive diagnostic output pins.

The MCU may include a multi-buffer serial peripheral interface communications interface component (MibSPI). The MibSPI may use multiple buffers to allow accelerated communications with devices external to the MCU. The MCU may have three independent MibSPI ports, each of which may be dedicated to communications with one of three accelerometer chips. The buffer function of the MibSPI allows for transmission and receipt of data with minimal oversight from the CPU.

The MCU may include a serial peripheral interface communications interface component (SPI). The SPI may be the same as the MibSPI except the SPI may lack buffers. Thus, the SPI may require more CPU interaction for data transfer. The MCU may have one SPI port, which is used to communicate with a power supply.

The MCU may include a serial communications interface (SCI). The SCI may be referred to as a universal asynchronous receiver-transmitter (UART). The SCI may be used to communicate to external systems via an asynchronous serial interface. In the SS, the SCI may be used to communicate to a local RS-232 service port. Another serial port may be implemented to run a local interconnect network component (LIN) an SCI mode. This second SCI port may be used to transmit data via a fiber optics network to a SSRS display. The receive portion of this port may not be used because the fiber optics connection to the SSRS display may be a one direction transmission to prevent faults in the SSRS from impacting the safety functions of the SS.

The MCU may include a dual clock comparator (DCC). The DCC may allow comparison of frequencies of two selected clock sources. In the SS software, the DCC may be used to make two frequency comparisons to ensure main clock signals remain in tolerance. If a clock is found out of tolerance, a warning message may sent to a SSRS display. The clocks compared may be: (1) a main 10 MHz crystal oscillator to a trimmed 10 MHz Low Power Oscillator (LPO High—internal RC time base) and (2) the main 10 MHz crystal oscillator to a 200 MHz Phase Lock Loop 1 (PLL1).

The MCU may include a programmable built-in self test (PBIST). The PBIST may be used to perform programmable hardware based tests of MCU memory banks with minimal oversight from the CPU. The PBIST may be used to verify RAM based memory banks at start up by using a series of test patterns.

The MCU may include a CPU self-test controller (STC). The STC may be used to perform programmable hardware based tests of CPU cores, which may be performed at system startup or during normal system operations.

The MCU may include a programming and debugging interface (JTAG). The JTAG is an industry standard connection for programming, testing, and debugging of integrated circuits. In the MCU, The JTAG may be used to initially program the MCU prior to operations. The JTAG may also be used to provide access to internal register and memory data for debugging purposes. Although the SS's software may not use the JTAG directly, the JTAG may perform a significant function for debugging and programming the MCU.

Power Supply

Figure 2:
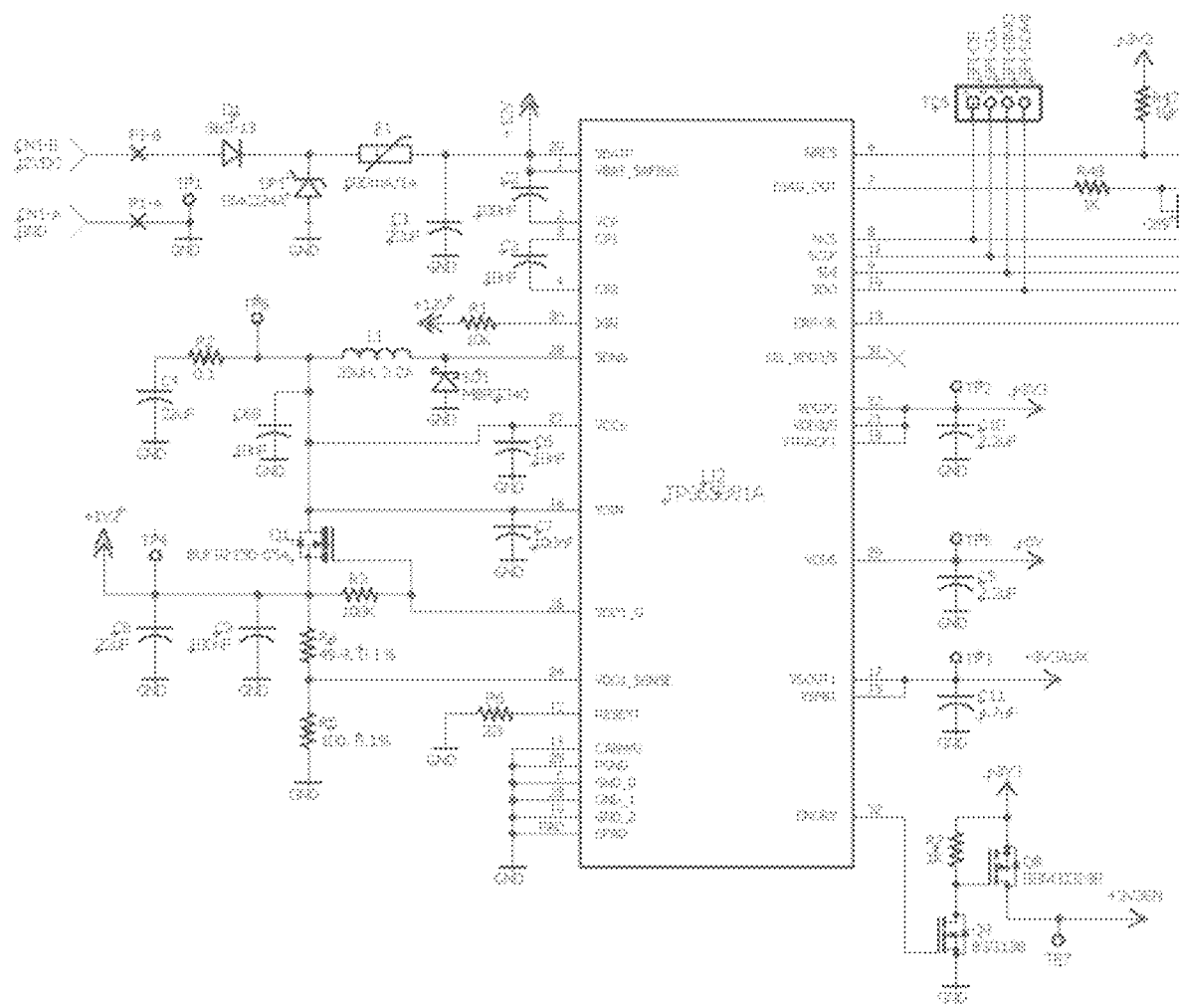
FIG. 2 is a schematic of a power supply of a SS according to embodiments of the present disclosure.

The SS may include a smart power supply system that communicates with the MCU via a SPI port. FIG. 2 illustrates a power supply according to the present disclosure. The power supply may include a question and answer watchdog system, an error signal monitoring system, reset control, and an on-board diagnostic system. Details of the power supply may be found in the TI data sheet "SLVSDJ1A-TPS65381A-Q1 Multirail Power Supply for Microcontrollers in Safety-Relevant Applications," revised May 2017.

The power supply may regulate input voltage, which may be nominally supplied at 12 VDC, down to a required voltage for SS internal operations. This may include initially using a charge pump to boost incoming voltage to approximately 17 VDC. From there a switching preregulator may step the voltage down to 6 VDC. The 6 volts may further be regulated down to a 5V supply. The 5V supply may be two independent supplies (e.g., a 3.3V supply and a 1.2V supply). The 5V supply (+5V) may not be used in the SS. A main 3.3 supply (+3V3) may be used to power the MCU I/O, output relays, indicator lights, and accelerometers. An auxiliary 3.3V supply (+3V3AUX) may be switched on and off via the SPI port and may be protected from external shorts to ground or power without affecting other power supply rails. The +3V3AUX may be used to power a fiber optics port and RS-232 serial service port. A 1.2V supply (+1V2) may be used to supply power to a core of the MCU, exclusively. The power supply may have internal thermal protection that shuts down supply rails if overloaded.

A power supply chip may be provided with a SPI port that allows the power supply chip to communicate with the MCU for diagnostic functions, power supply control, and for watchdog functions. The power supply may be the slave and the MCU may be the master.

The power supply may be equipped with diagnostics for its onboard circuitry. This may include under and over voltage detection, logic failure detection, voltage reference failure detection, as well as others. The power supply may provide an analog/digital multiplexer (MUX) that can be used to pass signals, as selected via SPI port commands, to a common output pin (DIAG_OUT). This pin in the SS may be connected to an ADC input pin of the MCU. This configuration allows the MCU to select specific voltages or digital signals for analysis via the ADC interface. This information may be used to detect faults or out of tolerance values as well as provide data to be relayed to a SSRS display for observation. Voltages that are above the MCUs input limit for the ADC (e.g., 3.3V) may be scaled by the power supply to an acceptable value prior to being passed out of the DIAG_OUT pin.

The power supply chip may contain a watchdog system that is used to ensure proper MCU operations from an MCU independent location. The watchdog system ensures proper operations by providing a question (e.g., token) to the MCU via the SPI port. The MCU uses this question to develop four unique answers to the question. These answers must be passed to the watchdog system in a correct order and in a correct timing sequence, or the watchdog system may flag the response as incorrect. If too many incorrect answers are provided, the watchdog system resets the MCU and, though an independent signal provided on the ENDRV output pin, shutsdown output relays, placing them in a failsafe mode. The ENDRV signal may be a significant part of failsafe operations of the SS. The ENDRV signal places the output relays in a failsafe position by dropping power to the +3V3EN power bus to the relays. The ENDRV signal is held in the failsafe position anytime the MCU is unable to satisfy the watchdog system. This ensures the MCU is fully functional prior to operations of the output relays. Watchdog systems of a simpler arrangement may be used to provide equivalent failsafe functionality.

Upon system power up, the power supply system may be responsible for ensuring power supply rails are within tolerance and stable before allowing the MCU out of reset. The power supply may also reset the MCU upon failure of the watchdog system as an attempt to restore normal operations. An external manual system reset button may be provided on the SS's circuit board and may be used for debugging and testing. This manual reset may signal an IGN pin of the power supply, which may perform a deglitching function to remove contact bounce. Once de-bounced, the signal resets the power supply internal logic to a power up mode and resets the MCU via a reset line.

The power supply may provide an ERROR input pin for monitoring an ERROR output signal from the MCU. This interface provides a high speed way to reset the MCU when catastrophic faults occur within the MCU without the need to wait for the watchdog system to time out. A benefit of this is to provide fast real time recovery of the system in time critical safety functions. The SS may not have any high speed recovery requirements, so this function may not be required.

A hardware pin connector may be provided to allow an external logic analyzer to be connected to signals between the MCU and the power supply for diagnostic purposes. The connector may provide 4 SPI signals.

Accelerometers

The SS may include three tri-axial MEMS accelerometers (e.g., Analog Devices ADXL355). The accelerometers may use micro machined balance arms to detect acceleration forces, such as gravitational forces or seismic forces.

FIG. 3 illustrates an accelerometer internal architecture. Each accelerometer may provide three axis output signals representing the X, Y, and Z directions. In the SS, acceleration signal range may be selected to be +/−2 g and the data may be provided as a signed 20 bit value (e.g., 3.9 µg resolution). It may be beneficial for this value to be scaled to determine the actual g-force applied. The accelerometers may have an effective frequency range from direct current (DC) to near 2 KHz. The seismic forces of interest to building structure collapse are in the 2 Hz to 15 Hz range, thus providing a large margin of bandwidth response on either end of the frequency spectrum of interest. The data sheet provided from analog devices, "ADXL354/ ADXL355—Low Noise, Low Drift, Low Power, 3-Axis MESM Accelerometers," revision 0, provides details of accelerometer operations.

The accelerometers may provide data via a built in SPI port that is connected to the MCU. The accelerometers may be slaves and the MCU may be the master. Two external signals may be provided to a accelerometer in addition to SPI data. A SYNC and an EXT CLK signal may be provided to allow best match synchronization of data collection points with the MCU RTOS system 400 Hz rate. An accelerometer may use internal circuits, including an interpolation filter, to provide data acquisition information that matches the SYNC and EXT CLK signal timing to the SPI data port. The collection of data from a point most closely timed to the 400 Hz RTOS may ensure data rate synchronization with the digital filter update rate, which is also clocked at the 400 Hz rate. This may allow for comparison of signals from three accelerometers to detect possible faults.

An accelerometer may perform a self-test. When activated via the SPI port, an accelerometer may place an electrostatic force on each of its three axis balance arms to simulate an acceleration signal. The MCU can then read back the acceleration values to verify the accelerometers are operating as expected.

An accelerometer may contain temperature measurement capability. The temperature roughly indicates the internal temperature of the SS enclosure plus the heat generated by the accelerometer itself. This value may be used to warn of over or under temperatures within the SS enclosure and may be reported to a SSRS display. Moreover, this value may be used to indicate an internal fault if temperature is outside acceptable operating ranges for the accelerometer(s).

An accelerometer may contain a First In-First Out (FIFO) buffer. FIFO functionality of an accelerometer may not be used. Data acquisition may be timed using the SYNC and EXT CLK signals so that acceleration values can be read directly from the current X, Y, and Z data registers without any FIFO buffering being required.

An accelerometer may be provided with 3.3V from the main power supply. This power may be further regulated down to two 1.8V supplies that may be used by analog and digital circuits within the accelerometer. These two supplies may be monitored via the ADC of the MCU for fault detection. It may be beneficial to prevent acceleration conversions while sampling these power supplies with the ADC to prevent possible noise induced by switching the ADC sample and hold capacitor into the accelerometer power supply, causing noise on the power supply rail affecting the sample.

A hardware pin connector may be provided for each accelerometer to allow an external logic analyzer to be connected to signals between the MCU and the accelerometer for diagnostic purposes. The connector may provide 4 SPI signals as well as the SYNC and EXT CLK signals. On test boards with accelerometer chips uninstalled, this port can also be used for connection of external simulators that allow fault injection and simulated wave form playback.

Relay Drive Circuits

Figure 4:
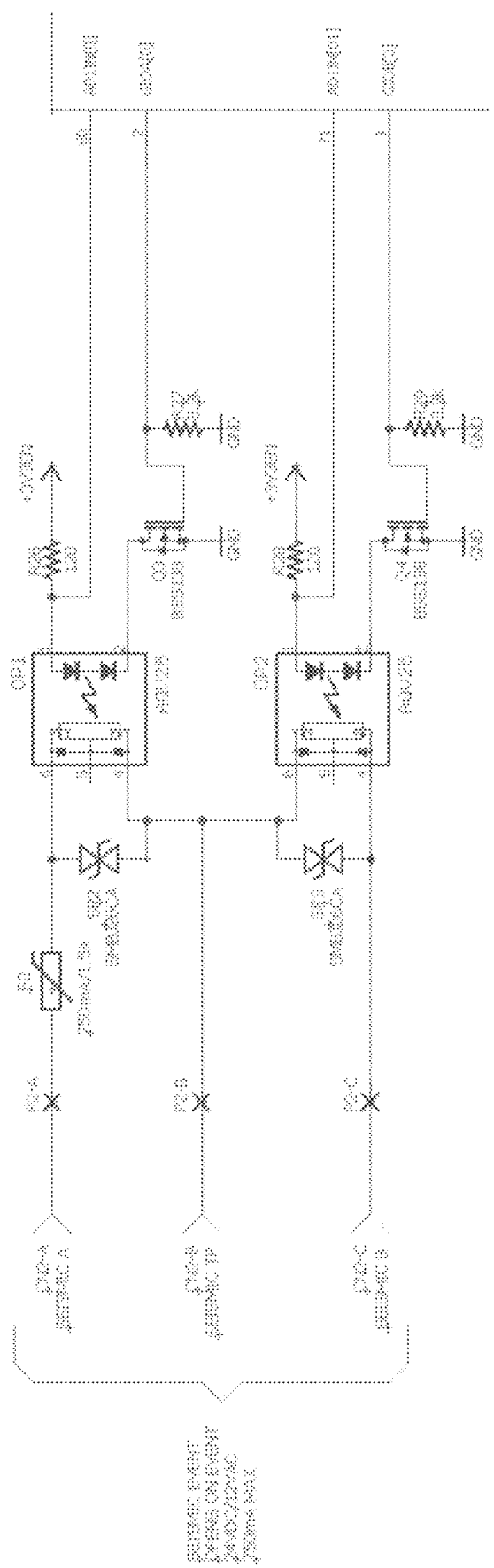
FIG. 4 is a schematic of a redundant safety output relay according to embodiments of the present disclosure.

The SS may use three outputs to signal a current status of the system (as illustrated in FIG. 4). The outputs may be seismic activity detected, internal fault detected, and/or low input voltage detected. The seismic output relay and the fault output relay may be part of various safety functions of the SS. The low voltage output relay may be part of non-safety fault detection functionality of the SS.

The SS may provide two redundant output relays, wired in series for each of the safety outputs, and a single output relay for the non-safety function. The relays may be optically isolated solid-state relays to eliminate the possibility of contact chatter during an extreme seismic event. The relays may be designed to remain closed during normal operations and to open on detection of an event or in a fail-safe condition.

Each relay may be driven by a separate GIO output signal from the MCU and its driving current may be monitored through a separate ADC input signal for fault detection purposes. The solid-state output contacts may be electrically isolated from the SS's internal circuitry to prevent electrical noise from interfering with MCU operations. Output contacts may be protected by an auto-reset positive temperature coefficient (PTC) type thermal fuse. A test point may be provided between the two redundant output relays so that each relay's operation can be tested independently for manual diagnostic purposes.

The MCU may monitor the voltage via the ADC input connected to pin 1 of each of the output relays. The voltage present at this location and the fixed value of a 120 ohm current limiting resistor allow the MCU to calculate a relay coil drive current. In this way, the MCU can monitor for proper operation of a MOSFET drive circuit, the relay coil (internal LED), and the MCU GIO output pin.

Figure 5:
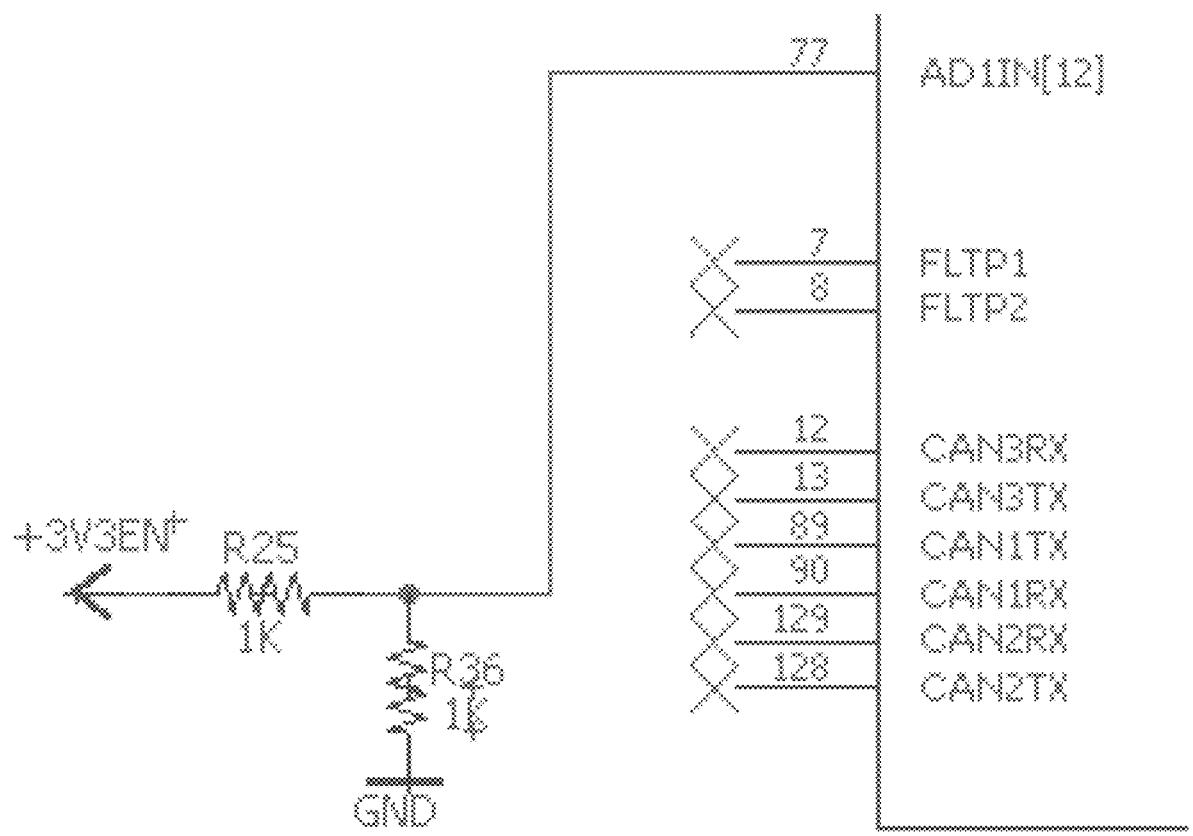
FIG. 5 illustrates a +3V3EN monitoring circuit according to embodiments of the present disclosure.

The MCU also monitors the +3V3EN power rail via an ADC input and R25/36 voltage divider (as illustrated in FIG. 5). This power rail may provide drive voltage to all the output relay coils and is controlled by the power supply ENDRV fail safe signal.

The SS may have a configurable option via a service mode to pulse the output relay drive circuit off for a relatively short time, then return it to its normal state. This allows the MCU to cycle the drive circuits while observing the coil drive current to detect any possible "stuck on" condition that may be present. This option may require the externally driven circuits to have a ride through capability to remain unchanged during this test to prevent false triggering of the remaining shutdown circuits. It may be beneficial for the ride through time to be at least 5 mS to assure the test does not false trigger the external circuits. If insufficient ride through time is available, this feature can be disabled, thus eliminating this fault detection capability.

Remote Trip Reset

Figure 6:
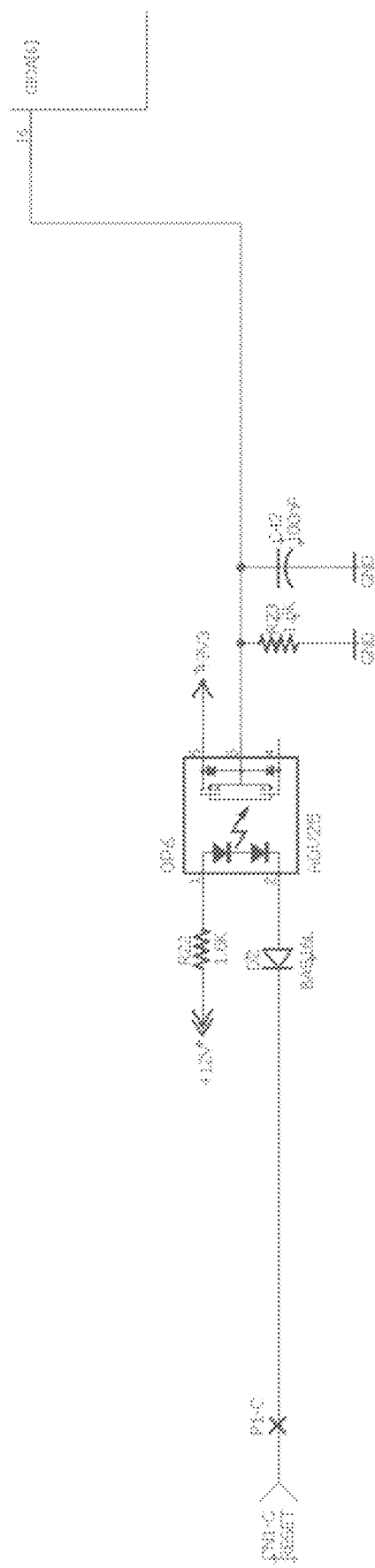
FIG. 6 is a schematic of an external reset according to embodiments of the present disclosure.

An optically isolated input circuit may provide a way to remotely reset a seismic trip. FIG. 6 illustrates an external reset. The optical isolator may toggle the GIO input pin on the MCU whenever the external reset signal is present. The input side of the optical isolator may be powered from the 12V supply voltage internally to the SS. The input pin may be connected to ground to create the reset. The SS's software may use an edge triggered response to prevent a continual external reset signal from preventing or prematurely resetting a future seismic event alarm.

Local Indication Lights

Four indicator lights (e.g., light-emitting diodes (LEDs)) may be located on a face of the SS for local indication of operations. The indicator lights may all be illuminated briefly at power up to validate operation. The indicator lights may also be cycled through manual commands while the SS is in a service mode.

The SS may include an operations indicator. The operations indicator may be green in color and may flash at about a 1 Hz rate to signal normal operations. The operations indicator may be driven by a combination of 1 Hz and 400 Hz RTI clock sources through the SS operating system. Under normal operating conditions, the operations indicator may be on for about 500 mS and off for about 500 mS. Steady on or steady off may indicate improper operations.

The SS may include a seismic trip indicator. The seismic trip indicator may be red in color and may illuminate upon a seismic event trip of the system. The seismic trip indicator may be off when the system is in a normal mode and the seismic output relays are closed.

The SS may include a fault indicator. The fault indicator may be yellow in color and may illuminate upon detection of a non-recoverable fault in the SS system. The fault indicator may be off when the system is in a normal mode and the fault output relays are closed. For some catastrophic fault conditions that halt MCU operations, the fault indicator may not be turned on by the MCU. The fault may be correctly indicated by (1) the output relays through fail safe controls and (2) the operations indicator stopping flashing.

The SS may include a service indicator. The service indicator may be blue in color and may illuminate when the SS is in a service mode of operations. Illumination of the service indicator may represent the SS is not performing its safety function(s).

Figure 7:
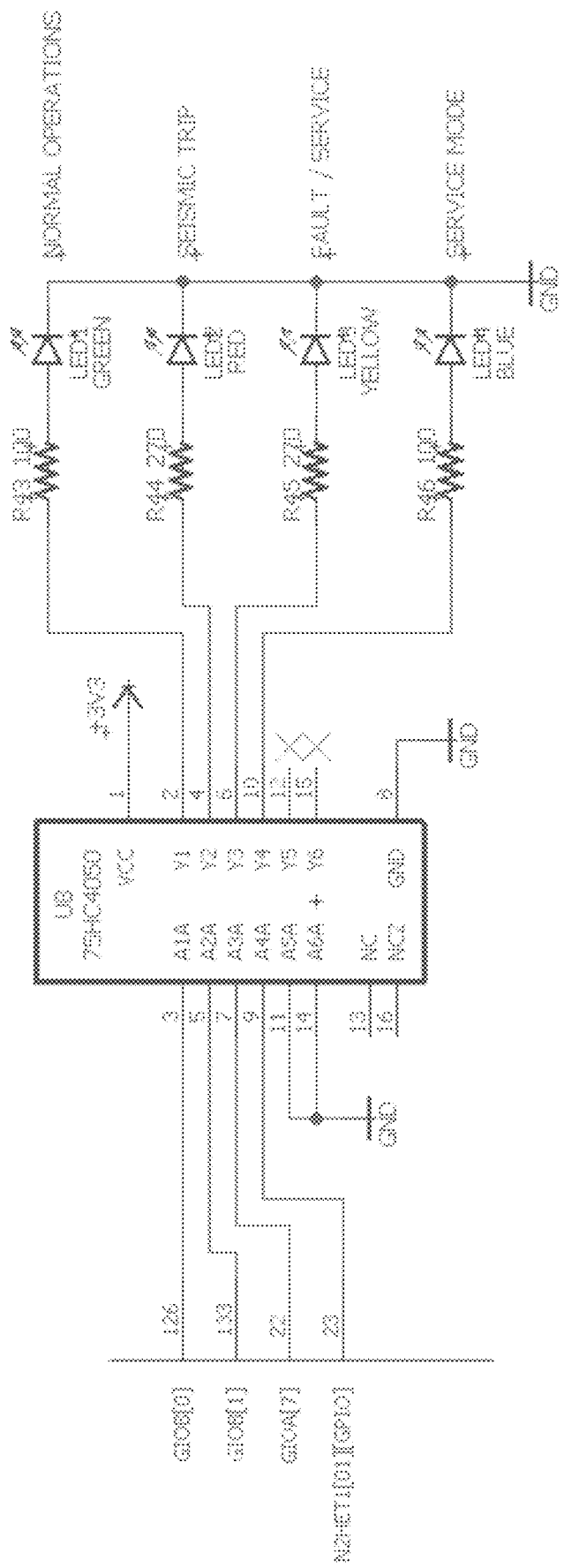
FIG. 7 is a schematic of an indicator drive circuit according to embodiments of the present disclosure.

Each indicator of the SS may be controlled by an separate GIO pin on the MCU and driven by an external buffer circuit (illustrated in FIG. 7). The service indicator may use a N2HET output pin that has been remapped for GIO use.

Serial Service Port

Figure 8:
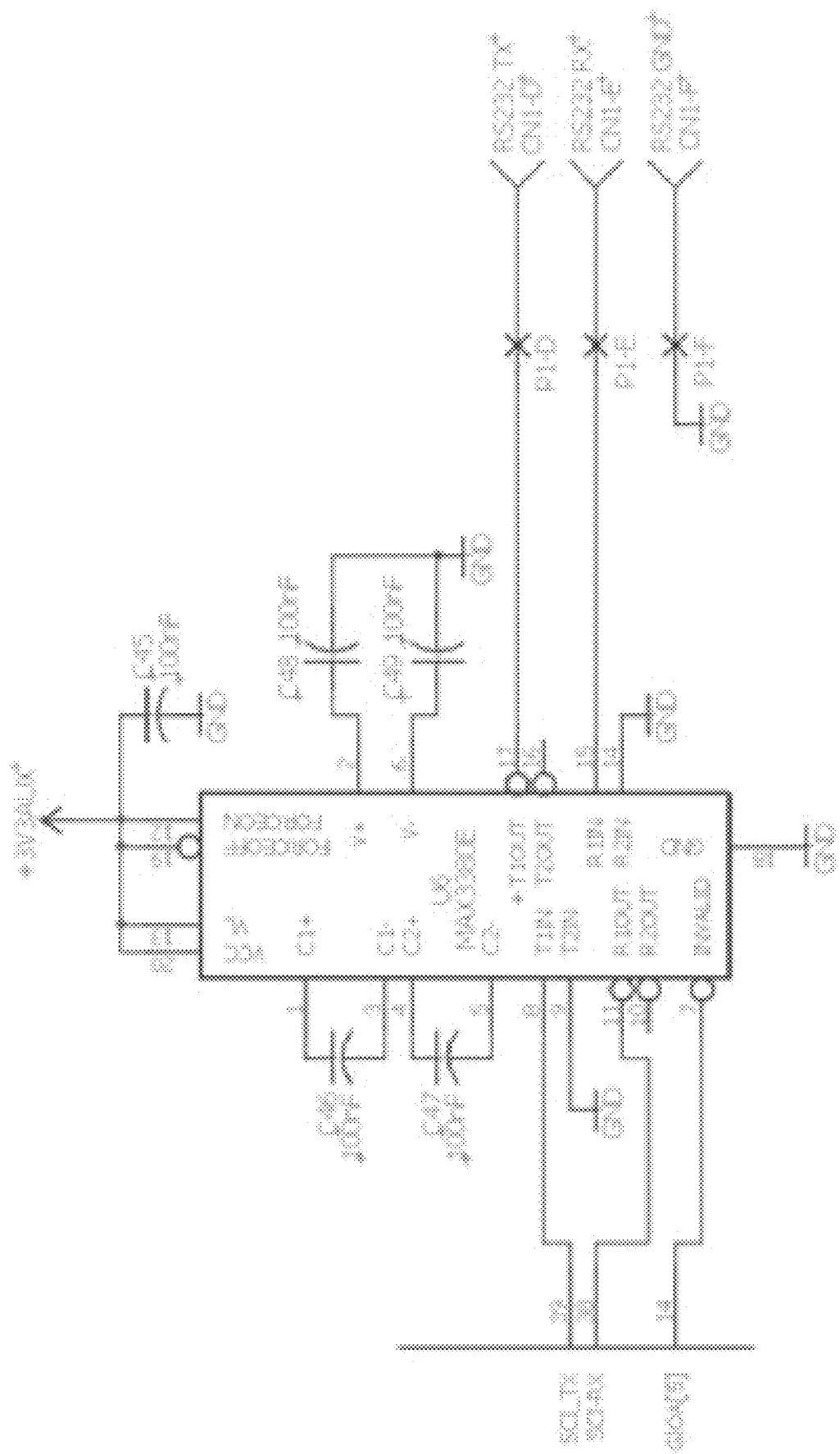
FIG. 8 is a schematic of a serial service port according to embodiments of the present disclosure.

The SS may include a RS-232 serial port for local connection to a service terminal. FIG. 8 is a schematic of a serial service port. The port provides a transmit and receive data line. RS-232 line levels voltages, both positive and negative, may be provided by a capacitor pump circuit provided in the port buffer circuit. The port buffer circuit may provide surge protection on external lines to protect the MCU from external noise. The port buffer circuit may also include a detection circuit that can detect if an external serial port is connected based on the receive line's voltage level. This "port connected" signal may be passed to the MCU via a GIO input pin where it is used to signal a warning message to a SSRS display that a service terminal has been connected to the SS. The data transfer to and from the port may be handled by the SIC peripheral interface using a polling interface with the MCU (non-interrupt driven). This limits the ports throughput but may be acceptable due to the limited number of operator key strokes used to operate the service port.

Fiber Optics Remote Status Port

Figure 9:
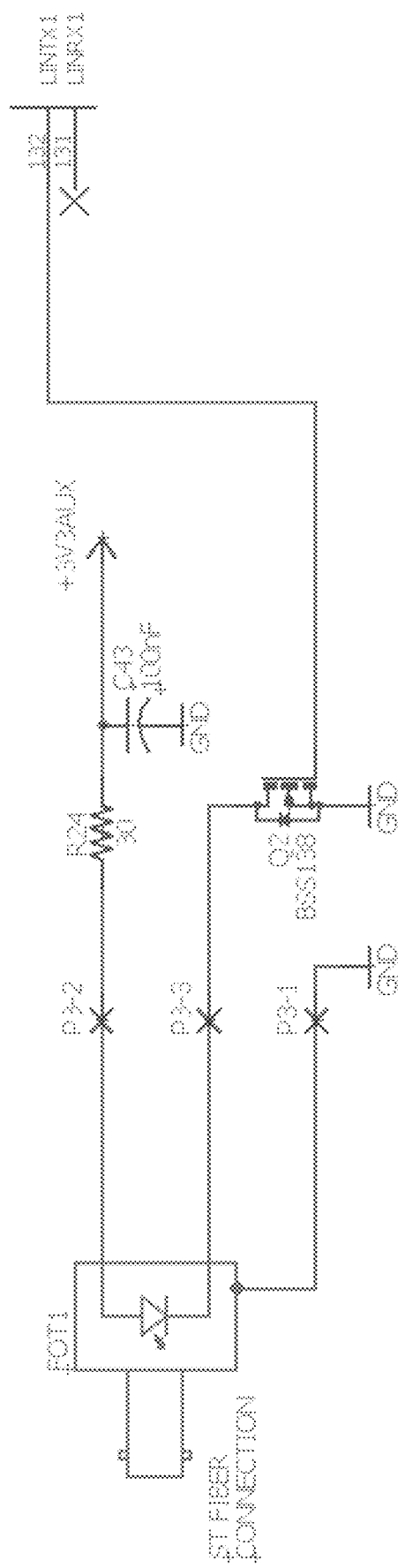
FIG. 9 is a schematic of a fiber optic port according to embodiments of the present disclosure.

The SS may include a fiber optic transmitter or other transmission means. FIG. 9 is a schematic of a fiber optic port. The fiber optic transmitter may use an ST type connector. The fiber optic transmitter may be used to send status and alarm information to a SSRS display. The fiber optic transmitter may be a transmit only port that uses the LIN, run in the SIC mode, to handle data transfers.

Diagnostics Port

Figure 10:
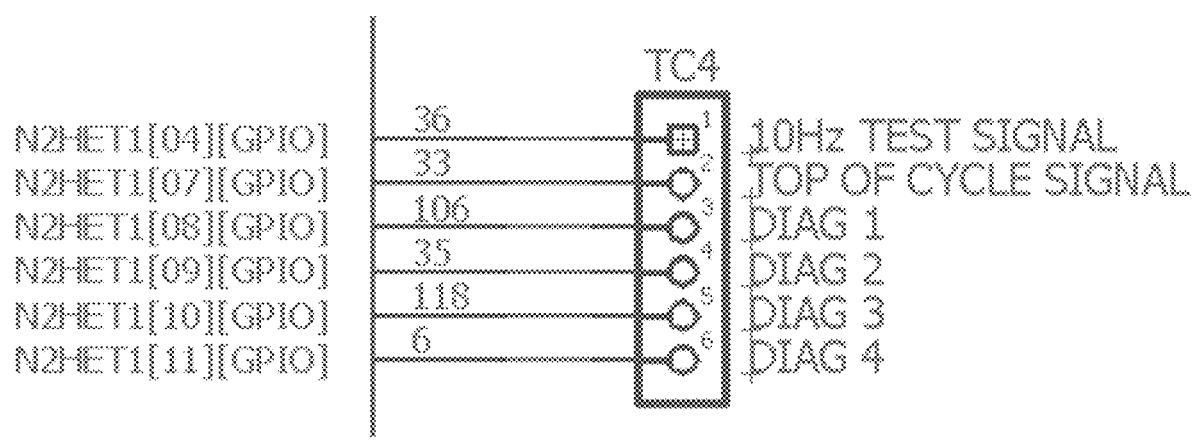
FIG. 10 illustrates a diagnostics port according to embodiments of the present disclosure.

The SS may include a diagnostic port (as illustrated in FIG. 10). A pin header of the diagnostics portion may provide several signals that may be used to test and debug system operations. Illustrative pin functions are described below.

A 10 Hz test signal may be provided from a TC4-1 pin. The test signal may be provided for verification of the main system crystal frequency. A 10 MHz main crystal may be multiplied by a MCU internal Phased Locked Loop (PLL) circuit to 200 MHz. This signal may then be divided down to 10 Hz by the N2HET peripheral. A 10 Hz signal on this pin may indicate a correct main crystal frequency and PLL multiplication operations. After initial setup on the N2HET, this signal may be generated independent of CPU operations. Thus, this signal may not be used to validate continued correct operation of the CPU.

A top of cycle signal may be provided by a TC4-2 pin. The top of cycle signal may be generated by the SS's operating system at the top of each RTOS cycle. The on duration may represent the time used to service the watchdog system. Under normal operating system conditions, this signal may cycle on and off at a 400 Hz rate. Failure to cycle at this rate indicates an incorrect operating system.

Pins TC4-3 to TC4-6 may be used to flag events or processes within the MCU for debugging purposes. The software of the SS may be used to drive these pins with correct signals.

Hardware Voltage Monitor

Figure 11:
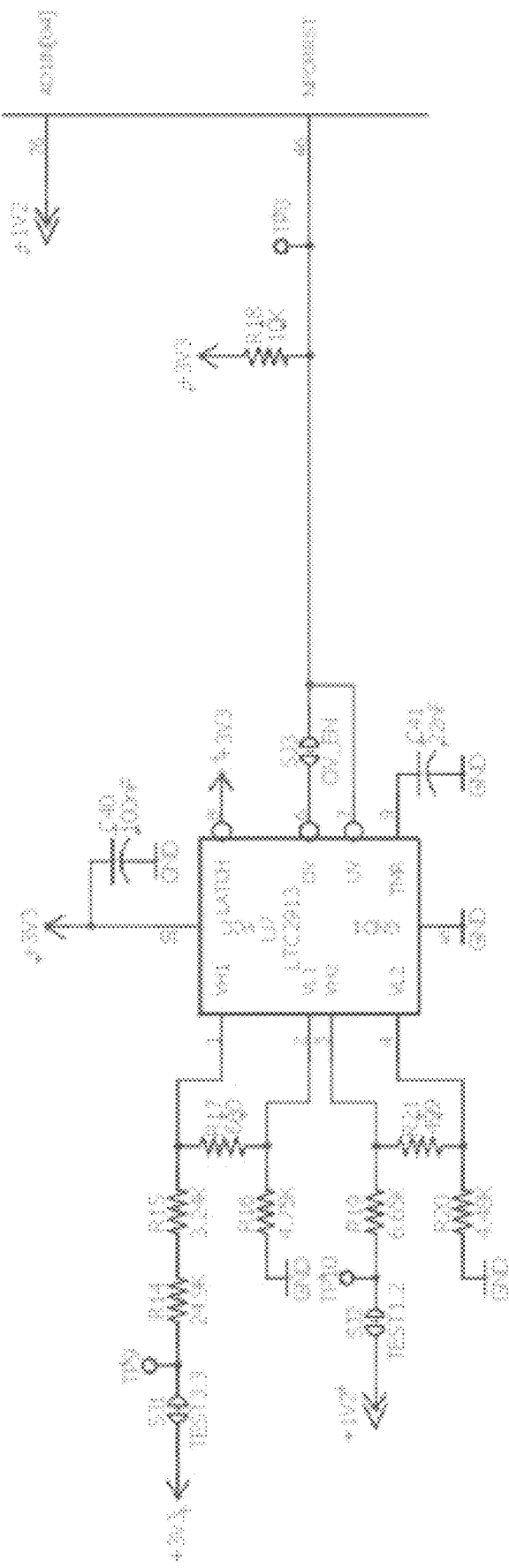
FIG. 11 is a schematic of a hardware voltage monitor according to embodiments of the present disclosure.

The SS may include a voltage monitor circuit (illustrated in FIG. 11). The voltage monitor circuit may monitor MCU power supplies for normal operations. The voltage monitor circuit may monitor the +3V3 and the +1V2 power rails to detect if the voltages are within the normal operating range of the MCU. If the voltages are found to be outside of acceptable operating range of the MCU, the MCU may be held in reset through the NPSRRST pin until the voltages return to normal. This supervisory circuit may be a hardware only monitoring system that has no software component.

This additional hardware system may be beneficial due to the power supply system not having a hardware monitoring system for the 1.2V rail built in to the power supply. This hardware may also act as a power up monitor that ensures the MCU is not released from reset during initial power supply startup until the voltages are acceptable for normal operations. The 3.3V supply may be monitored for redundancy only.

The ADC may have an input that allows monitoring of the 1.2V supply. This allows the MCU to know about potential power issues prior to the hardware monitor forcing the MCU into reset.

JTAG Interface

Figure 12:
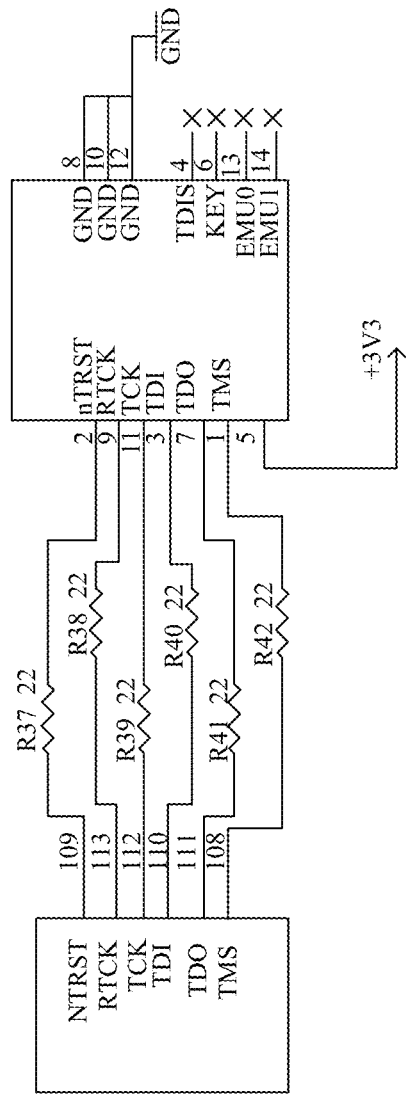
FIG. 12 is a schematic of a JTAG interface according to embodiments of the present disclosure.

The MCU may provide a JTAG interface (illustrated in FIG. 12). The JTAG interface may provide a way to program, debug, and test the MCU.

Hardware to Software Interface

Table 1 below provides illustrative monitored and controlled signals connected to the MCU. Table 1 also provides physical pins the signals may be connected to on the MCU. Table 1 provides signals that directly interact with the SS's software.

TABLE 1

Hardware signals - MCU connections.

| Signal Name | Purpose | Hardware Connection | Safety Related | MCU Pin |
|---|---|---|---|---|
| RLY_S_A_MON | Monitoring seismic output relay A drive current | AD1IN[0] | Yes | 60 |
| RLY_S_B_MON | Monitoring seismic output relay B drive current | AD1IN[1] | Yes | 71 |
| RLY_F_A_MON | Monitoring fault output relay A drive current | AD1IN[2] | Yes | 73 |
| RLY_F_B_MON | Monitoring fault output relay A drive current | AD1IN[13] | Yes | 79 |
| RLY_V_MON | Monitoring low voltage output relay drive current | AD1IN[3] | No | 74 |
| 1V2_MON | Monitoring 1.2 V power supply | AD1IN[4] | No | 76 |
| DIAG_OUT | Monitoring the output signal of the power supply MUX. Sub Signals Provided via MUX: 2 A1_VDD5 - 5 v Power Supply (x2) A2_VDD6 - 6 V Power Supply (x3) A3_VCP - Charge Pump Supply (x13.5) A4_VSOUT - 3.3 V Aux Supply (x4) A6_VBATP3 - 12 v Input Voltage (x10) A7_MAIN_BG - Main Regulator Band Gap Reference (x1) | AD1IN[5] | No | 78 |

TABLE 1-continued

Hardware signals - MCU connections.

|  | A8_VMON_BG - Voltage Monitor Band Gap Reference (x1) Digital MUX values read through SPI | | | |
| --- | --- | --- | --- | --- |
| ACC1_1V8_D | Accelerometer 1 - 1.8 v digital supply monitor | AD1IN[6] | No | 80 |
| ACC1_1V8_A | Accelerometer 1 - 1.8 v analog supply monitor | AD1IN[7] | No | 61 |
| ACC2_1V8_D | Accelerometer 2 - 1.8 v digital supply monitor | AD1IN[8] | No | 83 |
| ACC2_1V8_A | Accelerometer 2 - 1.8 v analog supply monitor | AD1IN[9] | No | 70 |
| ACC3_1V8_D | Accelerometer 3 - 1.8 v digital supply monitor | AD1IN[10] | No | 72 |
| ACC3_1V8_A | Accelerometer 3 - 1.8 v analog supply monitor | AD1IN[11] | No | 75 |
| 3V3EN_MON | Monitoring 3.3 v relay drive enable power supply | AD1IN[12] | No | 77 |

| Signal Name | Purpose | Hardware Connection | Safety Related | MCU Pin | Direction |
| --- | --- | --- | --- | --- | --- |
| RLY_S_A_DRV | Drive signal for seismic output relay A | XIOA[0] | Yes | 2 | Out |
| RLY_S_B_DRV | Drive signal for seismic output relay A | GIOB[3] | Yes | 1 | Out |
| RLY_F_A_DRV | Drive signal for fault output relay A | GIOA[1] | Yes | 5 | Out |
| RLY_F_B_DRV | Drive signal for fault output relay A | GIOB[2] | Yes | 142 | Out |
| RLY_V_DRV | Drive signal for low voltage output relay | GIOA[2] | No | 9 | Out |
| IND_G_DRV | Drive signal for green indicator light | GIOB[0] | No | 126 | Out |
| IND_R_DRV | Drive signal for red indicator light | BIOB[1] | No | 133 | Out |
| IND_Y_DRV | Drive signal for yellow indicator light | BIOB[7] | No | 22 | Out |
| IND_B_DRV | Drive signal for blue indicator light | N2HET1[1] (GIO Mapped) | No | 23 | Out |
| ACC1_SYNC | Accelerometer 1 SYNC signal output | MIBSPI1_NENA (GIO Mapped) | No | 96 | Out |
| ACC1_EXT_CLK | Accelerometer 1 EXT_CLK signal output | N2HET1[16] | No | 139 | Out |
| ACC2_SYNC | Accelerometer 2 SYNC signal output | MIBSPI3_NENA (GIO Mapped) | No | 54 | Out |
| ACC2_EXT_CLK | Accelerometer 2 EXT_CLK signal output | N2HET1[18] | No | 140 | Out |
| ACC3_SYNC | Accelerometer 3 SYNC signal output | MIBSPI5_NENA (GIO Mapped) | No | 97 | Out |
| ACC3_EXT_CLK | Accelerometer 3 EXT_CLK signal output | N2HET1[20] | No | 141 | Out |
| REMOTE_RST | Remote reset signal input | GIOA[6] | No | 16 | In |
| SERVICE_PORT_ACT | Monitors for an active connection on the Serial Service Port | GIOA[5] | No | 14 | In |
| 10HZ_TEST | Provides a 10 Hz signals for calibration checking | N2HET1[4] | No | 36 | Out |
| TOP_OF_CYCLE | Provides diagnostic pulse for testing at the top of each operating system cycle | N2HET1[7] (GIO Mapped) | No | 33 | Out |
| DIAG_1 | Provides diagnostic pulse for testing | N2HET1[8] (GIO Mapped) | No | 106 | Out |
| DIAG_2 | Provides diagnostic pulse for testing | N2HET[9] (GIO Mapped) | No | 35 | Out |
| DIAG_3 | Provides diagnostic pulse for testing | N2HET[10] (GIO Mapped) | No | 117 | Out |

TABLE 1-continued

| | Hardware signals - MCU connections. | | | | | |
|---|---|---|---|---|---|---|
| DIAG_4 | Provides diagnostic pulse for testing | N2HET[11] (GIO Mapped) | No | 6 | Out | |

| Signal Name | Purpose | Hardware Connection | Safety Related | MCU Pin | Speed |
|---|---|---|---|---|---|
| PS_SPI | Power Supply SPI Communications | SPI4 | Yes | 24, 25, 30, 31 | 4 MHz |
| ACC1_SPI | Accelerometer 1 SPI Communications | MibSPI1 | Yes | 105, 95, 93, 94 | 8 MHz |
| ACC2_SPI | Accelerometer 1 SPI Communications | MibSPI3 | Yes | 55, 53, 52, 51 | 8 MHz |
| ACC3_SPI | Accelerometer 1 SPI Communications | MibSPI5 | Yes | 32, 100, 99, 98 | 8 MHz |
| FIBER_COM | Fiber Optics Serial Communications to SSRS Display | LIN (SIC2 Mode) | No | 132 | 115,200 BAUD |
| SERVICE_COM | Serial RS-323 Communications Service Port | SIC1 | No | 39, 38 | 9,600 BAUD |

Software

Development Software

Several design and debugging software packages may be used for the development and testing of the SS's software. Some or all of the software packages may be obtained from Texas Instruments. Two development software packages that may be used include "Code Complier Studio" (CCS) and "Hardware Abstraction Code Generator" (HALCoGen), which are both obtainable from Texas Instruments. Both packages have been rigorously evaluated under automotive standards for use in safety systems.

CCS may be the main interface for the development of the SS's software. It provides an Eclipse based interface that has been augmented for use in an embedded development environment. The software provides an ANSI standard C (and C++) compiler for use with ARM type CPUs. Interfaces that allow programming and debugging via a hardware connected JTAG interface allow detailed debugging capability at the machine level.

HALCoGen provides a customizable interface between the C based code and hardware level registers. With most embedded applications, it may be necessary that the programmer understand and manipulate hardware registers directly to interface with MCU hardware. HALCoGen allows the programmer to specify how the hardware should be configured using an easy to understand interface. From there HACCoGen generates custom APIs that provide a high level interface to the C code. The APIs may be modified by the programmer to customize the APIs by placing code between the "user code start" and "user code end" comments. Any code placed in these locations will remain untouched even when HALCoGen regenerates its output code. Specifics about how HALCoGen is used in the SS are provided below.

To ensure constancy during software development, the support software packages used may be limited to a specific version. Changes from the specific version may require additional re-verification of the SS software prior to use. Code composer Studio, Version 7.1.0.00016 may be used. HALCoGen, Hardware Abstraction Layer Code Generator, Version 04.06.00 may be used.

HALCoGen Software

The HALCoGen support package generates customized APIs for use within the end software package. This section details which APIs may be used as well as what the APIs are used for.

HALCoGen provides routines that initiate startup MCU functions and perform a basic self-test that should be completed before allowing the MCU to operate normally. Table 2 below lists function libraries and functions that may be used to perform these startup steps. The "custom" column of Table 2 indicates if the provided libraries require customization for the SS. The "order" column of Table 2 indicates an approximate normal order the functions are called in. Numbers in parentheses may only be called in special cases.

TABLE 2

| | MCU startup libraries and functions. | | | |
|---|---|---|---|---|
| Order | Library | Function | Use | Custom |
| 0 | sys_intvecs.asm | resetEntry | Reset entry vector | No |
| 1 | sys_startup.c | _c_int00 | MCU core startup | Yes5 |
| 2 | sys_core.asm | _coreInitRegisters_ | Initiates CPU core registers to predefined state | No |
| 3 | sys_core.asm | _coreStackPointer_ | Initialize Stack Pointers | No |
| (4) | sys_core.asm | _esmCcmErrorsClear_ | On specific silicon versions this fixes errata | No |

TABLE 2-continued

MCU startup libraries and functions.

| Order | Library | Function | Use | Custom |
|---|---|---|---|---|
| 5 | sys_core.asm | _coreEnableEventBusExport_ | Enabled memory error detection reporting | No |
| 6 | sys_core.asm | _coreEnableFlashEcc_ | Enabled flash memory error detection | No |
| 7 | sys_core.asm | _errata_CORTEXR4_66_ | Silicon errata correction | No |
| 8 | sys_core.asm | _errata_CORTEXR4_57_ | Silicon errata correction | No |
| 9 | system.c | systemInit | Continuation of system setup | No |
| 10 | system.c | setupPLL | Configures and starts PLL clock multipliers | No |
| 11 | sys.selftest.c | efcCheck | Self-checks EFIS module | No |
| 12 | sys.selftest.c | efcStuckZeroTest | Performs stuck at zero test on EFUSE module | No |
| 13 | sys.selftest.c | efcSelfTest | Self-checks EFUSE module memory | No |
| (14) | sys.selftest.c | selftestFailNotification | System error notification | Yes6 |
| 15 | system.c | periphInit | Enable clocks to peripherals | No |
| 16 | pinmux.c | muxInit | Configure I/O multiplexing | No |
| 17 | sys_selftest.c | checkefcSelfTest | Check for completion of EFUSE self-check | No |
| 18 | system.c | setupFlash | Setup flash memory wait states | No |
| 19 | system.c | trimLPO | Trim low power oscillator to 10 MHZ | No |
| 20 | sys_selftest.c | fmcBus2Check | Check flash controller | No |
| 21 | sys_selftest.c | fmcECCcheck | Checks Flash ECC error detection logic | No |
| 22 | system.c | mapClocks | Map clock domains | No |
| 23 | sys_selftest.c | errata_PBIST_4 | Errata workaround fix | No |
| 24 | sys_pmu.asm | _pmuEnableCountersGlobal_ | Enables PMU counter | No |
| 25 | sys_pmu.asm | _pmuResetCounters_ | Resets PMU counter | No |
| 26 | sys_pmu.asm | _pmuStartCounters_ | Starts PMU counter | No |
| 27 | sys_pmu.asm | _pmuStopCounters_ | Stops PMU counter | No |
| 28 | sys_pmu.asm | _pmuGetCycleCount_ | Gets PMU counter value | No |
| 29 | sys_pmu.asm | _pmuDisableCountersGlobal_ | Disables PMU counter | No |
| 30 | sys_selftest.c | pbistSelfCheck | Run a diagnostic check on the memory self-test controller | No |
| 31 | sys_selftest.c | pbistRun | Perform specified built-in self-test using PBIST module | No |
| (32) | sys_selftest.c | pbistIsTestCompleted | Check status of test | No |
| 33 | sys_selftest.c | pbistIsTestPassed | Check if PBIST passed test | No |
| 34 | | pbistFail | Handle PBIST failure | Yes |
| 35 | sys_selftest.c | pbistStop | Stops current PBIST test | No |
| 36 | sys_core.asm | _coreDisableRamEcc_ | Disable RAM ECC | No |
| 37 | sys_selftest.c | memoryInit | Initialize CPU RAM | No |

TABLE 2-continued

MCU startup libraries and functions.

| Order | Library | Function | Use | Custom |
|---|---|---|---|---|
| 38 | sys_core.asm | __coreEnableRamEcc__ | Enable RAM ECC | No |
| 39 | dabort.asm | __dabort | Called by interrupt for memory errors, Trap for bad memory | No |
| 40 | sys_selftest.c | checkRAMECC | Test the CPU ECC mechanism for RAM accesses | No |
| 41 | sys_selftest.c | checkFlashECC | Test the CPU ECC mechanism for FLASH accesses | No |
| 42 | sys_selftest.c | enableParity | Enable parity on selected RAMs | No |
| 43 | sys_selftest.c | memoryInit | Initialize all on-chip SRAMs except for MibSPIx RAMs | No |
| 44 | sys_selftest.c | disableParity | Disable parity on selected RAMs | No |
| 45 | sys_selftest.c | het1ParityCheck | Test HET1 Parity | No |
| 46 | sys_selftest.c | htu2ParityCheck | Test HET2 Parity | No |
| 47 | sys_selftest.c | adc1ParityCheck | Test ADC1 Parity | No |
| 48 | sys_selftest.c | adc2ParityCheck | Test ADC2 Parity | No |
| 49 | sys_selftest.c | vimParityCheck | Test VIM Parity | No |
| 50 | sys_selftest.c | dmaParityCheck | Test DMA Parity | No |
| 51 | sys_selftest.c | mibspi1ParityCheck | Test MibSPI1 Parity | No |
| 52 | sys_selftest.c | mibspi1ParityCheck | Test MibSPI3 Parity | No |
| 53 | sys_selftest.c | mibspi1ParityCheck | Test MibSPI5 Parity | No |
| 54 | sys_core.asm | __coreEnableIrqVicOffset__ | Enable IRQ offset via Vic controller | No |
| 55 | sys_vim.c | vimInit | Initialize VIM RAM and registers | No |
| 56 | esm.c | esmInit | Configure system response to error conditions signaled to the ESM group1 | No |
| 57 | autoinit.c | __TI_auto_init | initialize copy table | No |
| 58 | startup.c | __system_post_cinit | hook function called the C/C++ auto-initialization function | No |
| 59 | sys_main.c | main | First call to main application | No |

HALCoGen provides routines that provide a simplified interface to the MCU on chip peripherals. Table 3 below lists libraries and functions that may be used by the SS.

TABLE 3

HALCoGen Peripheral APIs.

| Library | Function | Use | Custom | Used |
|---|---|---|---|---|
| adc.c | adcInit | Initiates the ADC interface | No | sys_main.c |
|  | adcStartConversion | Starts conversion of ADC specified group of channels | No | diag.c |
|  | adcIsConversionComplete | Returns the conversion status of the ADC | No | diag.c |
|  | adcGetData | Extracts data from ADC buffer to local storage array | No | diag.c |
|  | adcMidPointCalibration | Performs a hardware based midpoint calibration of the ADC | No | diag.c |
| crc.c | crcInit | Initiates the CRC interface | No | sys_main.c |
|  | crcChannelReset | Resets the CRC hardware channel specifed | No | diag.c stpt.c |

TABLE 3-continued

HALCoGen Peripheral APIs.

| Library | Function | Use | Custom | Used |
|---|---|---|---|---|
| dcc.c | Data types defined in ddc.h used only | DCC register interface | No | diag.c |
| gio.c | gioInit | Initiates the GIO interface | No | sys_main.c |
| | gioSetBit | Sets value of one output pin | No | acc.c<br>diag.c<br>rtos.c<br>service.c<br>stpt.c |
| | gioGetBit | Gets value of one input pin | No | diag.c<br>service.c |
| het.c | hetInit | Initiates the N2HET interface, loads its timing program and starts it | No | sys_main.c |
| mibspi.c | mibspiInit | Initiates the MibSPI interface | No | sys_main.c |
| | mibspiSetData | Places data in output buffer | No | acc.c |
| | mibspiTransfer | Transfers data to and from external SPI device | No | acc.c |
| | mibspiIsTransferComplete | Returns the transfer status of the MibSPI port | No | acc.c |
| | mibspiGetData | Moves data from MibSPI input buffer to local storage array | No | acc.c |
| rti.c | rtiInit | Initiates the RTI timer | No | sys_main.c |
| | rtiStartCounter | Starts the specified RTI counter | No | sys_main.c |
| | rtiGetCurrentTick | Gets the current count of the specified RTI counter | No | acc.c<br>diag.c<br>rtos.c |
| sci.c | sciInit | Initiates the SCI serial ports | No | sys_main.c |
| | sciSendByte | Sends one byte of data | No | service.c |
| | sciIsRxReady | Returns the receiver status of the SCI port | No | service.c |
| spi.c | spiInit | Initiates the SPI interface | No | sys_main.c |
| | spiTransmitAndReceiveData | Transfers data to and from external SPI device | No | wd.c |
| ti_fee_xxx.c | TI_Fee_Init | Initiates the EEPROM emulation using FLASH memory | No | sys_main.c |
| | TI_Fee_ReadSync | Reads data from EEPROM synchronously | No | stpt.c |
| | TI_Fee_WriteSync | Writes data to EEPROM synchronously | No | stpt.c |
| | TI_Fee_MainFunction | Called to process background FEE functions | No | diag.c |
| | TI_Fee_GetStatus | Returns the status of FEE Background processes | No | sys_main.c |
| sys_dma.c | dmaReqAssign | Assigns a DMA channel to a peripheral | No | diag.c<br>rsp.c<br>service.c |
| | dmaEnable | Brings the DMA out of reset | No | rsp.c<br>service.c |
| | dmaSetCtrlPacket | Sets a DMA channel control parameters | No | diag.c<br>rsp.c<br>service.c |
| | dmaSetChEnable | Starts a DMA transfer | No | diag.c<br>rsp.c<br>service.c |
| notification.c | esmGroup2Notification | CPU Trap for ESM Group 2 Errors | Yes | notification.c |

Flash Memory APIs

Flash memory APIs may be used to read, write, erase, and verify FLASH memory within the MCU. The flash memory APIs may be used by the SS to store values that should be maintained during power down. These values may include safety set points, configuration settings, and calibration data. Details of the flash memory APIs may be found in Texas Instruments document "SPNU501H-F021 Flash API, Version 2.01.01, Reference Guide," revised April 2015.

To ensure constancy during software development, the flash memory APIs may be limited to a particular version. Changes to the version may require additional re-verification of the SS's software prior to use. The flash interface may be F201 Flash API, Version 2.01.01.

Software Implementation

Figure 13:
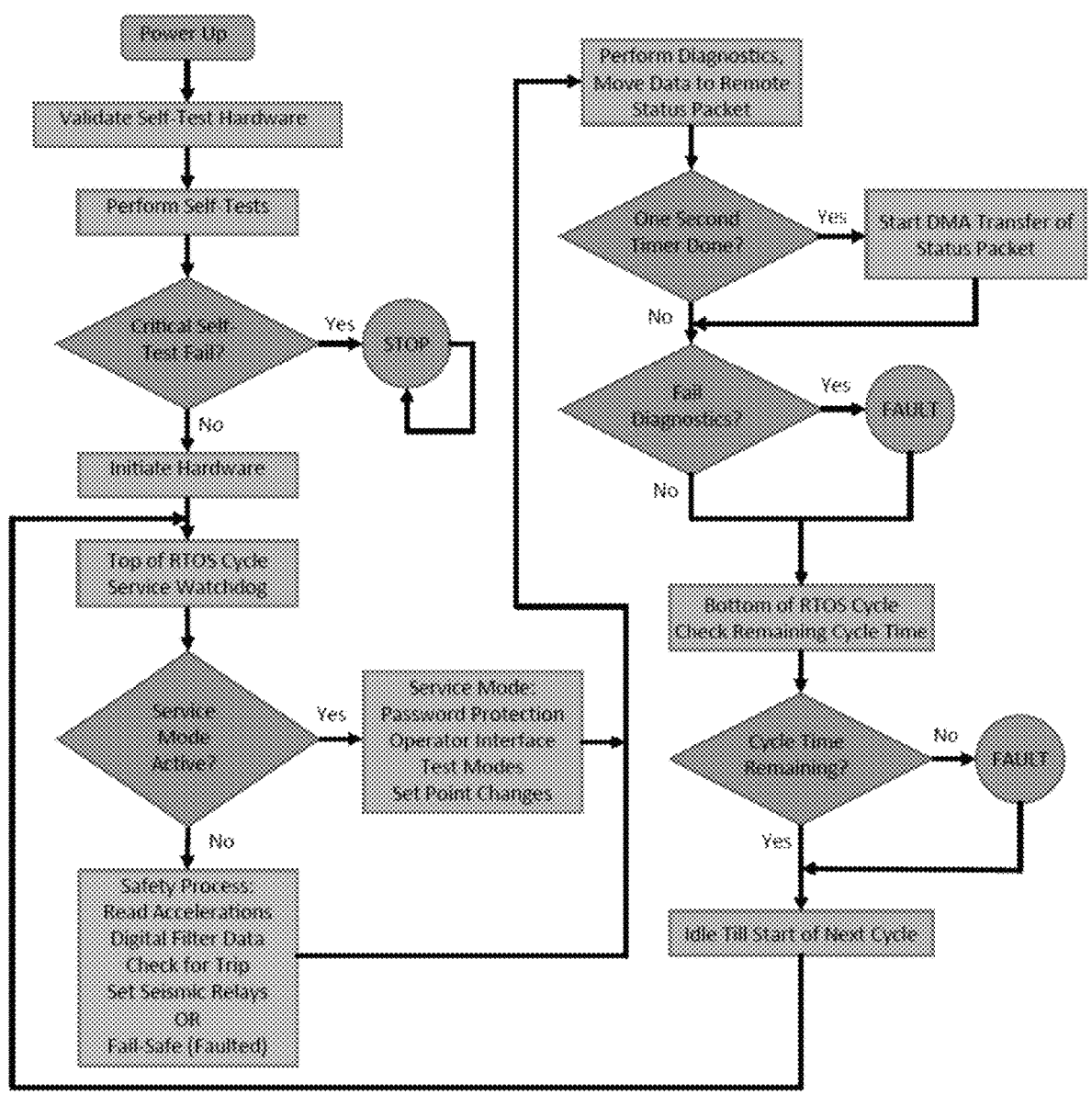
FIG. 13 is a process flow diagram illustrating a main system flow according to embodiments of the present disclosure.

This section provides details regarding how the SS's software is constructed in order to meet parameters described above. The SS may not use a traditional operating system, such as Windows or UNIX. The SS may use a Real Time Operating System (RTOS) customized for the SS's particular application. This provides a simple system that is easier to develop and test. FIG. 13 illustrates a main system flow.

Startup and Initial Self-Test

At least some of the code used for startup and initial self-testing may be provided by a self-generated HALCoGen output. Upon normal power up of the SS, the power supply and voltage monitor circuits may keep the MCU in reset until voltages are stable and at the correct voltages. When the MCU is released from Reset, it may jump to the reset vector address (0x00000000) and start executing code. The SS Reset vector address may contain a branch instruction that sends the MCU to a _C_int00( ) function at address 0xA7A0, where system initiation and testing begins. Resets caused by other than power up may also result in the same jump to the reset vector, but set additional system flags that are evaluated later in the code.

The status of the two internal CPU registers is unknown at reset. This can lead to a compare error in the CCM and result in a fault shutdown. To prevent this, functions use inline assembly instructions to set both CPU register sets to the same values.

On some version of silicon it is necessary to apply patches to allow continued operations. If the DEVICE_ID_REV indicates a Rev A chip, then a function may be applied to clear the issue.

To ensure the FLASH memory containing the program code is not defective, the EEC may be enabled to detect single and double-bit errors. Functions may use inline assembly instructions to enable this fault detection system.

Two more Errata corrections may be applied using functions. These may use inline assembly to correct known issues with the CPU R4 ARM core.

When HALCoGen provided start up code completes, program control is left at a main( ) function and the SS's custom code begins. Initialization functions may be called to setup the following peripheral interfaces: analog-to-digital converter peripheral; timer peripheral; serial service port and remote status port; real-time timers for RTOS functions; general purpose inputs and outputs; SPI ports to accelerometers; and/or the SPI port for power supply interface.

System settings may be preset as follows:
System Mode=STARTUP
Startup Delay=800 cycles
Critical Fault=Normal
Seismic Trip=Normal The next called functions may setup software functions, such as: set up DMA channels and databases for remote status reporting; retrieve set point, configuration settings, and calibration data from FLASH; and/or configure the power supply operating mode and set up the watchdog functions.

Startup fault injection failure flags may be transferred into a remote status packet for remote reporting. At this point, system operations have been validated as functional, all of the peripherals have been initiated, and all the initial variables have been set. The next step may be to start the RTOS system.

RTOS

The real time operating system (RTOS) may be the main operating system for the SS. Unlike traditional operating systems, which allocate a fixed amount of CPU time to each task based on priority, the RTOS system of the SS may act more like a master scheduler. The schedules and tasks may be selected in such a way that the operations of the system are deterministic.

The RTOS may use the term "cycle" to describe one complete pass of the RTOS system. The cycle has specific orders and timer frames set aside for specific tasks. In order to support this, the timing of each of the sub-tasks called by the RTOS should also be deterministic, or at least guaranteed to complete within a given maximum time. The RTOS selects tasks that, when placed end to end, can be completed in a single cycle. The time remaining at the end of the tasks is the idle time where no tasks are performed. If the idle time is too short, this indicates there is an issue with one or more of the tasks or the operation of the system as a whole, and a critical fault is generated.

Figure 14:
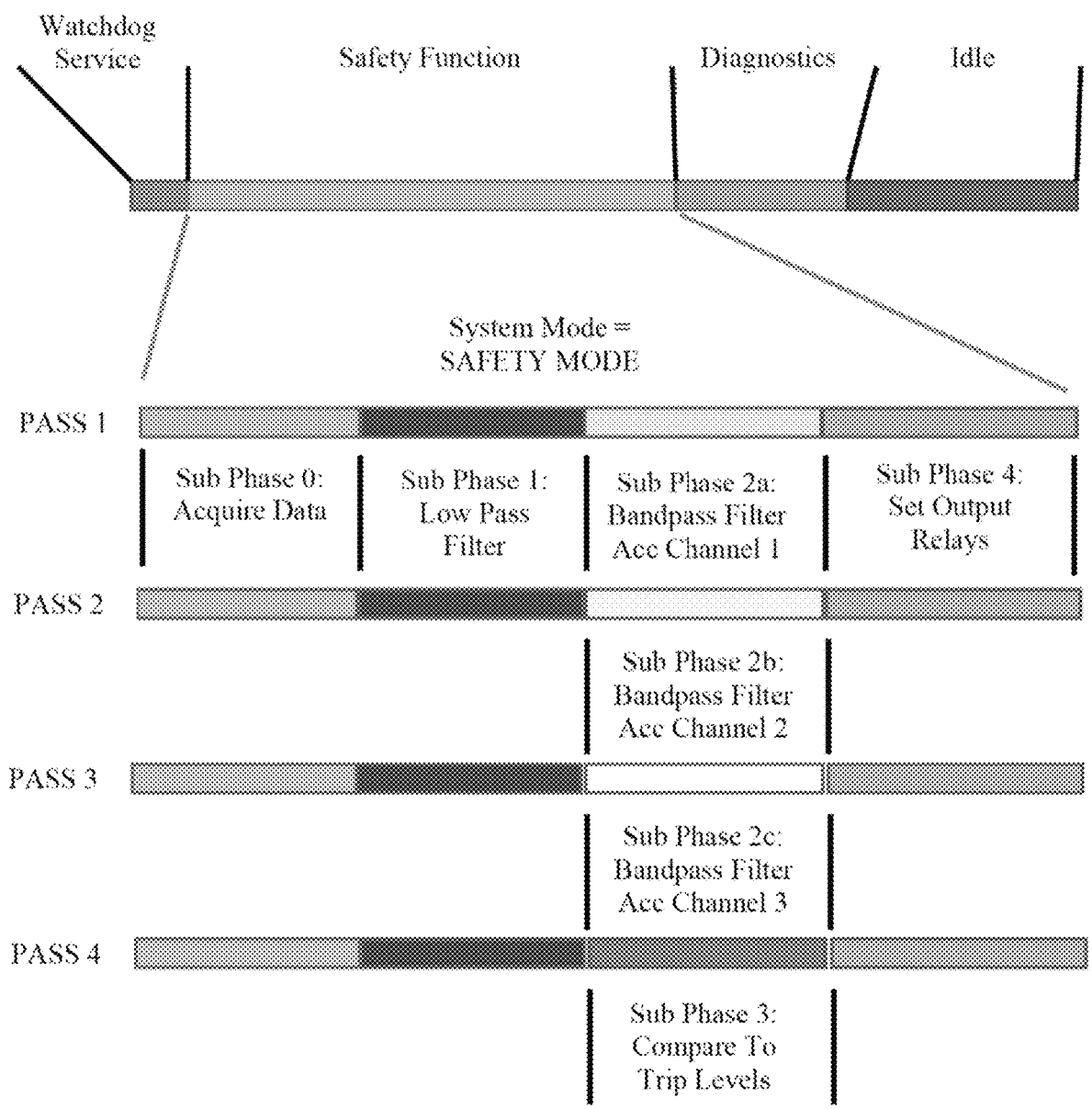
FIG. 14 illustrates a Real Time Operating System (RTOS) cycle according to embodiments of the present disclosure.

One complete RTOS cycle may include five phases. The phases may include the watchdog service, safety function, diagnostics, and idle (as illustrated in FIG. 14). Moreover, the safety function may include various safety mode sub phases as illustrated in Table 4 above.

Figure 15:
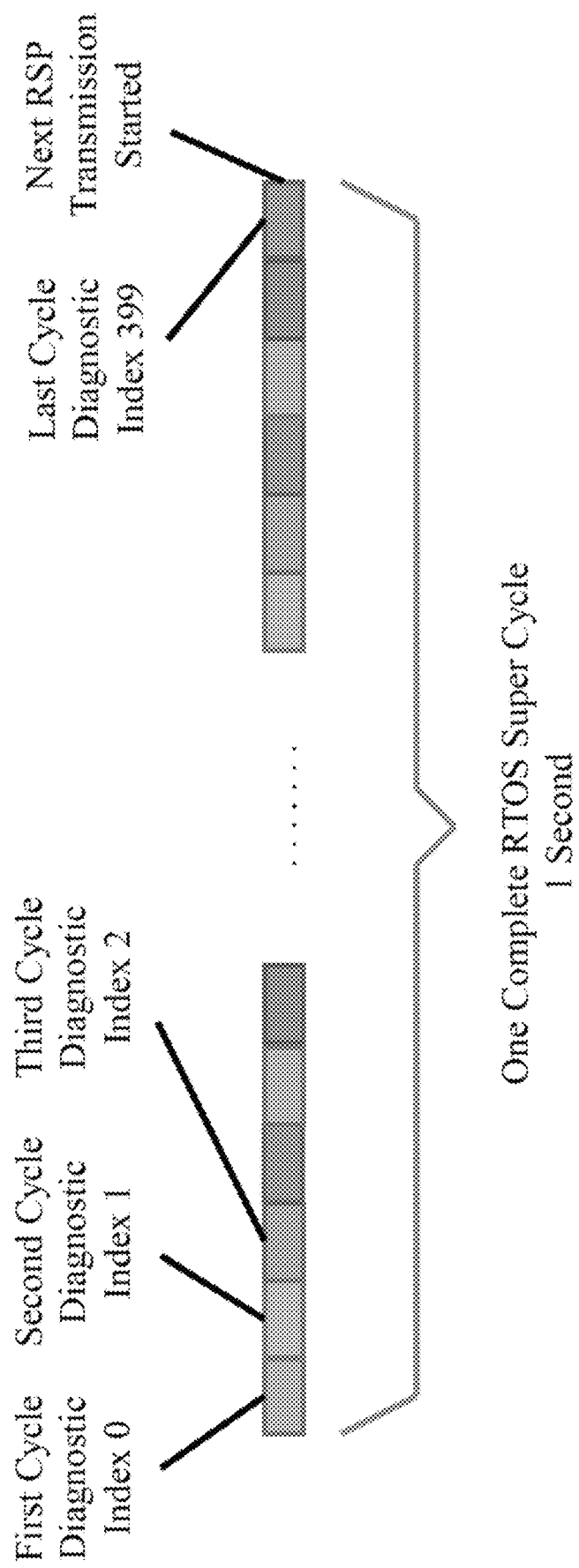
FIG. 15 illustrates a RTOS super cycle according to embodiments of the present disclosure.

The RTOS may use the term "super cycle" to describe 400 cycles that occur in one second. During an RTOS super cycle, the entire RSP may be filled with new data, and all diagnostic tasks (e.g., indexes) may be completed (as illustrated in FIG. 15).

The watchdog service phase may be the first phase of all RTOS cycles. In this phase, the watchdog system, which is located in the power supply, is serviced. While this phase is active, the "Top of Cycle" diagnostic output pin may be turned on, indicating the watchdog is being serviced. The time required to service the watchdog service phase may be different depending on if the watchdog is being asked for a question or is being provided with an answer.

In a safety function phase, safety functions are services. Depending on the system mode, a different set of tasks may be completed as represented in Table 4 below.

TABLE 4

Safety phase processes.

|  | Sub Phase |  | Process |
| --- | --- | --- | --- |
| System Mode = | 0 |  | Acquire new data from Accelerometers |
| SAFETY | 1 |  | Apply low pass digital filter to new data |
|  | 2a |  | Decimate data and pass data to bandpass filter for Accelerometer 1 |
|  |  | 2b | Decimate data and pass data to bandpass filter for Accelerometer 2 |
|  |  | 2c | Decimate data and pass data to bandpass filter for Accelerometer 3 |

TABLE 4-continued

Safety phase processes.

| | Sub Phase | | Process |
|---|---|---|---|
| | | 3 | Compare filtered data for all three channels to set point to determine trip status |
| | 4 | | Set output relays based on compare results |
| System Mode = STARTUP | 0 | | Acquire new data from Accelerometers |
| | 1 | | Apply low pass digital filter to new data |
| | 2a | | Decimate data and pass data to bandpass filter for Accelerometer 1 |
| | 2b | | Decimate data and pass data to bandpass filter for Accelerometer 2 |
| | | 2c | Decimate data and pass data to bandpass filter for Accelerometer 3 |
| | | 3 | No task |
| | 4 | | Check for completion of STARTUP mode, shift to SAFETY if done |
| System Mode = SERVICE | 0 | | No safety functions used in this phase - |
| | 0 | | Service mode is called in place of SAFETY function |
| System Mode = FAIL SAFE | 0 | | Acquire new data from Accelerometers |
| | 1 | | Apply low pass digital filter to new data |
| | 2a | | Decimate data and pass data to bandpass filter for Accelerometer 1 |
| | 2b | | Decimate data and pass data to bandpass filter for Accelerometer 1 |
| | | 2c | Decimate data and pass data to bandpass filter for Accelerometer 1 |
| | | 3 | Compare filtered data for all three channels to set point to determine trip status |
| | 4 | | Set and hold output relays in Fail-Safe positions |

When the System Mode is SAFETY, sub phases 2a, 2b, and 2c may act on different data each time the main RTOS cycle is run. The low pass filter may be applied to every new set of accelerometer data acquired. The decimation filter may remove one out of every four samples before passing the data onto the bandpass filter and comparator, thus reducing the number of data samples that are processed by subsequent stages. By alternating accelerometer channels being decimated in each cycle, the overall throughput can be increased. On the first pass, accelerometer 1 data may be passed through to the bandpass filter. On the second pass, the second accelerometer data may be passed through to the bandpass filter. On the third pass, the third accelerometer data may be passed through to the bandpass filter. On the fourth cycle, the bandpass output for all three accelerometer channels may be passed to the comparator for final evaluation. This staggering of the data filtering reduces the total amount of work that must be accomplished in any one RTOS cycle, effectively leveling the load between cycles. A similar process may be used in the STARTUP and FAIL-SAFE modes. The only difference may be that the output data is not evaluated for effect on the output relays.

The STARTUP mode may allow transition from power up or SERVICE mode without false triggering the system. Because the digital filters use past data to produce current output, it may be beneficial for time to be allowed to "fill" the past data buffers to ensure output of the digital filters accurately represents the correct values. By staying in the STARTUP mode for a short period of time, the digital filter buffers are correctly filled with data prior to allowing the comparator and relay output functions to operate.

A RSP ALARM flag may be cleared by the RTOS when the system moves from system mode STARTUP to system mode SAFETY.

In a diagnostic phase, various self-diagnostics may be performed as well as some general overhead tasks. The diagnostic functions may be selected such that all functions are completed in a 1 second (super cycle) time frame, thus allowing RSP data to be updated prior to transmission to a SSRS display. During the diagnostic phase, the serial service port may also be serviced. Some diagnostic functions may require more than one cycle to complete. These functions may be split into multiple RTOS cycles. Because the RTOS cycle is about 2.5 mS long (400 Hz), this allows up to 400 different diagnostic functions to be called during a 1 second RSP update. A last diagnostic call in the sequence of 400 may be a call to start a transfer of the RSP.

A state machine may be used to cycle the various tasks performed during the diagnostic phase. An index of the state machine may be updated every time an RTOS cycle completes, thus moving the diagnostic function on to a next sub phase. Each diagnostic function called may be required to complete and still allow adequate idle time at the end of the RTOS cycle to prevent the system from faulting.

During an idle phase, the amount of time left in the RTOS cycle is checked by reading the tick counter of the RTI component 400 Hz clock. There are 100 RTI ticks in an RTOS cycle so each tick represents 1% of the total RTOS cycle time. The idle phase may be required to be entered with at least 3% of the total cycle time remaining or a critical fault may be generated.

Once the remaining time is evaluated in the idle phase, the remainder of the idle time may not do anything. The start of the next RTOS cycle may be initiated when the RTI sets its cycle complete flag, indicating the tick counter has rolled over to zero.

Data Acquisition

The accelerometers used in the SS measure applied g-forces and may convert three axis values to signed 20 bit values. These values may be required to be read by the MCU via the SPI ports, have calibration factors applied, and converted to a floating point value expressed in g force. Data acquisition routines may provide the following functions.

An Initialization function sets critical parameters in the accelerometers to start normal operations. This may include setting the g-force range used by an accelerometer and the configuration of the INIT1 and INIT2 signal pins. By default, the INIT1 and INIT2 signal pins are outputs used to signal when an accelerometer has data ready. In the SS, these pins may be changed to inputs that accept external sync and clock signals. Resistors may be provided between the MCU GIO pins and the accelerometer INIT pins to limit pin currents should both be set to outputs inadvertently. The accelerometers may be set to accept an external sync and external clock signal through the initiation setup. The Initialization function may also set an accelerometer's internal low pass filter to a cutoff of 4000 Hz/1000 Hz and disable the high pass filter. Filtering of the data may be handled by the digital filters within the MCU. The range of acceleration readings may be set to +/−2 g full scale.

Figure 16:
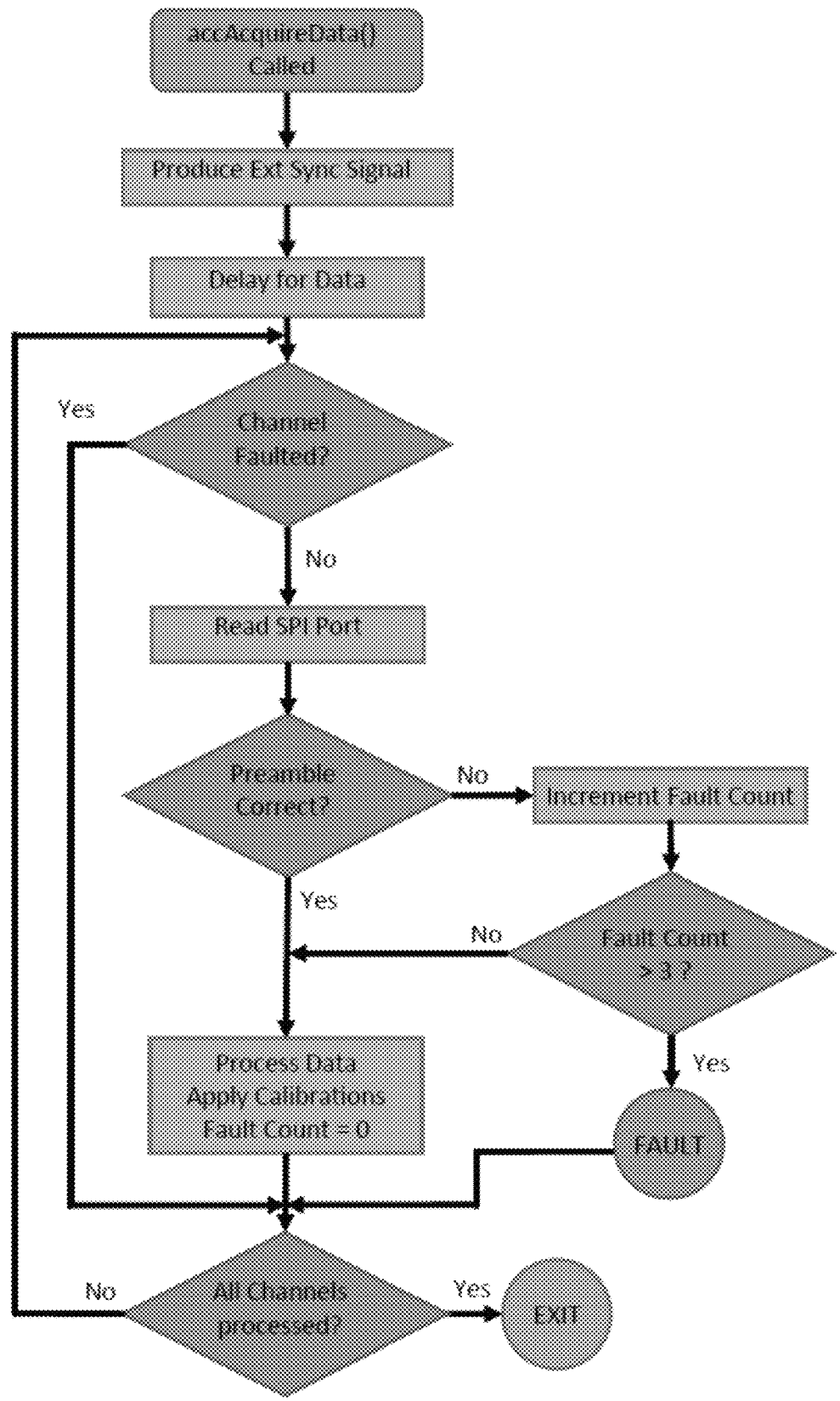
FIG. 16 is a process flow diagram illustrating a data acquisition flow according to embodiments of the present disclosure.

An AcquireData function may cause the MCU to read accelerations from all three axis of all three accelerometers. The MCU may then apply calibration data to correct the values and store the values as a float value that is used by other functions. The AcquireData function may create the sync signals needed and check that communications to accelerometers is working correctly. If an accelerometer does not provide a correct fixed preamble, then the communications to that channel have failed and the channel fault count may be incremented. The acceleration data remains unchanged for this cycle. If the fault count exceeds 3, the channel status may be set to faulted and the RSP may be updated to signal the fault to a SSRS display. If the channel recovers, by returning a good response before the fault count exceeds 3, the fault count may be returned to zero. See FIG. 16 for a general flow of data acquisition.

Channels may also be faulted by a parity error on the SPI control registers as indicated by the ESM. When a channel is faulted, a power cycle may be required to clear the fault. A faulted accelerometer channel may not open the fault output relays because the system can continue to operate under these conditions. Based on XooX configuration settings, one, two, or three faulted accelerometer channels may trigger a seismic trip due to faulted accelerometer channels being treated like a tripped channel by the comparator.

Table 5 provides illustrative flags set in the RSP when the AcquireData function detects faults. The diagnostic mode for the RTOS system may clear these flags at the start of a cycle and the AcquireData function sets the flags if the error persists.

TABLE 5

Data acquisition alarm flags.

| ALARM (4) | Accelerometer 1 Communications Failed |
|---|---|
| ALARM (5) | Accelerometer 1 Data Corrupted |
| ALARM (6) | Accelerometer 1 Channel Faulted |
| ALARM (10) | Accelerometer 2 Communications Failed |
| ALARM (11) | Accelerometer 2 Data Corrupted |
| ALARM (12) | Accelerometer 2 Channel Faulted |
| ALARM (15) | Accelerometer 3 Communications Failed |
| ALARM (16) | Accelerometer 3 Data Corrupted |
| ALARM (17) | Accelerometer 3 Channel Faulted |

The AcquireData function may provide specified accelerometer and axis data to other functions. This may be the only way to read the data values. No function may be provided to write the data, thus protecting the data from overwriting. An IsFaulted function may provide other functions the normal or faulted state of the accelerometer channel specified in a call.

Calibration data for each accelerometer and each axis may be accessed and protected by a GetCalibration function. The calibration data may be stored as a negative one g value and a positive one g scaling value. The values may be applied to the raw accelerometer data in the following way:

ZeroOffset=(POS_CAL−NEG_CAL)/2

Slope=TWO_G_NORMAL/(POS_CAL−NEG_CAL)

CalibratedValue=(RawValue−ZeroOffset)
 *Slope*RAW_TO_ENG

Where:
POS_CAL is the uncalibrated raw 20 bit signed integer value that was produced when the accelerometer was exposed to a positive one g acceleration.
NEG_CAL is the uncalibrated raw 20 bit signed integer value that was produced when the accelerometer was exposed to a negative one g acceleration.
ZeroOffset is the calculated integer zero g offset of the signal.
Slope is the calculated floating point number of the required correction to the slope of the value.
TWO_G_NORMAL is the integer value equal to the correct raw reading when one g is applied which is 256,000 counts.
RawValue is the uncalibrated 20 bit digitized signed integer value provided by the accelerometer
RAW_TO_ENG is the float value used to convert the raw count value to g-force units which is 3.90625e-6 in g per count
CalibratedValue is the calibrated acceleration in g-force units When the AcquireData function is called, the new output value may be compared to stored minimum and stored maximum values for the given channel for three axis. If the new value is below the minimum value, the minimum value is replaced with the new value. If the new value is above the maximum value, the maximum values is replaced with the new value. A Clear function may reset all channels axis minimum values to 99.0 and maximum values to 0.0. A MinMax function may be used to access this stored data.

The AcquireData function may accept a blanking request from the diagnostic function used to perform the accelerometer self-test. When an accelerometer channel is scheduled for a self-test, the diagnostic function turns on a blanking for the channel under test. The AcquireData function holds the value from the last cycle for the X, Y, and Z axes to prevent the self-test offset signal from being passed to the filters and comparators, which could possibly cause a false seismic trip. This function may only blank one channel at a time.

Watchdog System

The watchdog system, built into the power supply of the SS, may be a significant fail-safe feature of the SS. The watchdog system may provide a MCU independent monitor of the SS's operations. The use of a question and answer type system between the MCU and the power supply ensures a high reliability system. The power supply may have the ability to shut off the output relays in a fail-safe mode if the watchdog system times out, indicating an MCU failure. The watchdog system may also attempt to reset the MCU under these conditions to restore normal operations.

The timing of the watchdog system may be selected to coincide with the RTOS system cycle rate of 400 Hz. The power supply may be set up and the watchdog system may provide the correct modes of operation and timing characteristics. It may be beneficial for the watchdog system to perform this during the power up cycle while the power supply is still in the DIAGNOSTIC mode. Failure to initiate the power supply during the DIAGNOSTIC mode may cause it to fail to the SAFE state where it remains until the power is cycled or the IGN pin signal (e.g., power supply reset) is cycled. While in the SAFE state, the ENDRV output signal may be disabled, which prevents the operation of the output relays, thus holding the system in a fail-safe mode of operation.

If the power supply is initiated correctly during the DIAGNOSTIC mode of the power supply, the power supply may enter the ACTIVE mode, where it may remain during the entire time the system continues to operate unless forced to the SAFE state by the ESM ERROR pin signal. While in ACTIVE, the watchdog system should be serviced in the correct order and with the correct timing, or the watchdog system may timeout, dropping the ENDRV output signal and all of the output relays.

A correct order of events, starting with a request question phase, may be maintained. During this phase, it may be checked that the power supply watchdog system is also in a correct phase, or it corrects its sequence to re-sync to the watchdog system. The next four phases may provide the watchdog system with four correct answers in a correct order based on the question provide in the first phase. A lookup table may be used to provide the answers based on 1 of 16 questions asked. The answer may be calculated based on a specific algorithm. For expediency, the answers may be pre-calculated and stored in an array. By doing this, a watchdog system TOKEN_SEED may always be held at a value of zero, thus requiring only one set of answers to the questions. A Service function may be called once per RTOS cycle to ensure the watchdog system is serviced at the correct timing.

The watchdog system allows for a limited number of missed timing or incorrect answers before entering the fail-safe mode. Up to 5 watchdog system timing cycles can be missed prior to failing the ENDRV output signal. Up to 7 watchdog system timing cycles can be missed prior to experiencing a MCU reset. The count of the missed cycles may be monitored by the MCU and reported via the RSP to a SSRS display. When the system is operating normally with no missed watchdog system cycles, the watchdog system missed cycle count may be zero.

Remote Status Reporting

Remote status reporting may be handled through a two buffer system. Buffer "A" may be filled with current values collected from RTOS data and alarm collecting phases while buffer "B" may be transmitted to a SSRS display using a DMA transfer to a fiber optic port. After buffer B's transfer is complete and buffer A's data is ready to transfer, the buffers may be flipped. That is, buffer B may be filled with new data and buffer A may transmit data to a SSRS display. Data transfer may be scheduled by the RTOS to send one complete data packet every second (e.g., every super cycle). This method of collection and transfer ensures that no collisions occur between incoming newly collected data and outgoing transmitted data. This method may create a delay of up to one second in the transfer, but such delay may be acceptable. A SSRS display may time stamp incoming events to the nearest second. Alternate methods may be used, including a double buffer method where new data is placed in buffer A. Just prior to transmission the data update is temporarily suspended and all of buffer A is moved to buffer B. Data is then transmitted from buffer B while new data transfer to buffer A is resumed.

A feature to the remote status reporting may be the MCUs ability to provide unattended serial data transfer. A direct memory access (DMA) system may run in a semi-automatic fashion. The CPU may be required to set the starting address of the data, the length of data, and the port to send the data to in the DMA. After that, a single command from the CPU to the DMA may start the transfer. At that point, the CPU does not need to provide any support to complete the transmission and may continue with other tasks. The data transfer may be one directional (e.g., SS to SSRS), so no incoming data needs to be received or processed. The data packet size and transmission BAUD rate may ensure the entire transmission is completed prior to the next packet being ready to send. The MCU may use dual ported memory so DMA access to the memory does not interfere with CPU operations.

Data to be sent via the remote status transmission is collected by the RTOS during the non-safety portion of the cycle. If the RTOS operates at a rate of about 400 cycle per second, the collection of data may be split between many cycles. For instance, on one cycle the RTOS may collect power supply voltages and place the values in the buffer. The next cycle the RTOS may perform a diagnostic test and place the results of the test in the buffer. The data collection may continue throughout the one second collection time (e.g., a super cycle), resulting in a buffer with all new data ready to transmit prior the start of the next transmission.

The data sent though a Remote Status Packet (RSP) may always be in the same format. All values for all status points may be sent in every packet. The data packet may use a defined header that helps an SSRS locate the start of the packet. This header may include a packet ID number that increments with every transmission. This may be a four digit number sent with two bytes in Binary Coded Decimal (BCD) format. This number may start at 0000 at SS power up and may count to 9999 before rolling over to 0000.

The header format may aid in debugging by providing a pattern that is easy for a human to pick out of a data stream but not easily duplicated by random data in the data stream. The use of a BCD ID allows the ID to be viewed in hex or decimal without conversion needed to read the value. It also limits the number of valid values for these two bytes to 100 out of 256, further limiting the chance that random data would result in a false header.

The RSP data integrity may be verified using a CRC-16 footer value attached to the end of a packet. The header and all the data in the packet, up to the CRC value, may be compressed by the CRC hardware of the MCU prior to transmission. The two bytes making up a CRC-16 value may be added to the end of the RSP. A SSRS may perform the same CRC compression calculation on the incoming data. If the CRC value calculated at the SSRS matches the last two bytes of the RSP, the data packet is validated.

To sync the data stream between the SS and a SSRS, the SSRS may look for a series of four asterisks. Once found, the next two bytes may be saved as the packet ID. The data in this packet may not be considered valid and may only be used to calculate the CRC value. If the CRC value matches, the packet was considered good, otherwise the sync fails. When the next packet is received, the packet ID from the previous packet may be compared to the current packet ID.

If the new packet ID is one greater than the pervious and the CRC validates the packet integrity, then the systems are considered synced and the data may be extracted for use at the SSRS.

A sync between the SS and a SSRS may be lost if: the SSRS does not receive a valid packet within 2 seconds; RSP CRC check is incorrect; the packet ID does not increment from the previous packet; the packet length is incorrect (e.g., not all data bits are received in the normal time frame); and/or a byte(s) within the packet has framing errors or stop bit errors. Upon loss of sync, the SSRS may restart the process of re-syncing the data packet.

The data format of the RSP may be transmitted via the fiber optics port using a standard asynchronous serial transmission (e.g., using a 115,200 BAUD rate, 8 data bits, 2 stop bits, and no parity). With this transmission, format up to 11,520 bytes of data can be transmitted in the 1 second update rate, which is far more than the 213 bytes that are used for a RSP.

The RSP may be stored in the MCU memory as an array of structures. The array may have two dimensions. A 0 index may be the "A" buffer and a 1 index may be the "B" buffer. An illustrative structure is described below:

```
struct rspBuffer
{
    uint32 HEADER //Holds the header signature of "****"
    uint16 ID //Holds the BCD coded packet ID (0000 to 9999 range)
    sint16 ANALOG[84] //Holds the 85 analog values
    uint16 DIGITAL[4] //Holds the 64 digital values as a bit map
    uint16 WARNING[6] //Holds the 96 waning flags as a bit map
    uint16 ALARM[8] //Holds the 96 alarm flags as a bit map
    uint16 CRC //Holds the CRC value for the packet
}
```

The rspBuffer type holds all the data required for one remote status update. Table 6 below shows how this type may be expanded into its 8 bit transmission format, and also shows the assignment of data to specific locations within the buffer. The index column is the value used for rspParameter when calling RSP functions.

TABLE 6

Remote status packet format.

| Byte | Structure | Index | Description |
|---|---|---|---|
| 0 | HEADER | NA | Header signature string "****" |
| 4 | ID | NA | Packet ID number in BCD format, value 0000 to 9999 |
| 6 | ANALOG[0] | 0 | First Analog Value |
| ... | ... | | |
| 174 | ANALOG[84] | 84 | Last Analog Value |
| 176 | DIGITAL[0] - BITS 0 TO 15 | 0 to 15 | First set of 16 Digital Values |
| ... | ... | | |
| 182 | DIGITAL[3] - BITS 0 TO 15 | 48 to 63 | Last set of 16 Digital Values |
| 184 | WARNING[0] - BITS 0 TO 15 | 0 to 15 | First set of 16 Warning Values |
| ... | ... | | |
| 196 | WARNING[6] - BITS 0 TO 15 | 81 to 95 | Last set of 16 Warning Values |
| 198 | ALARM[0] - BITS 0 TO 15 | 0 to 15 | First set of 16 Alarm Values |
| ... | ... | | |
| 210 | ALARM[6] - BITS 1 TO 15 | 81 to 95 | Last set of 16 Alarm Values |
| 212 | CRC-16 Low Byte | NA | 16 Bit CRC value - lower byte |
| 213 | CRC-16 High Byte | NA | 16 Bit CRC value - upper byte |

Digital Filter

Figure 17:
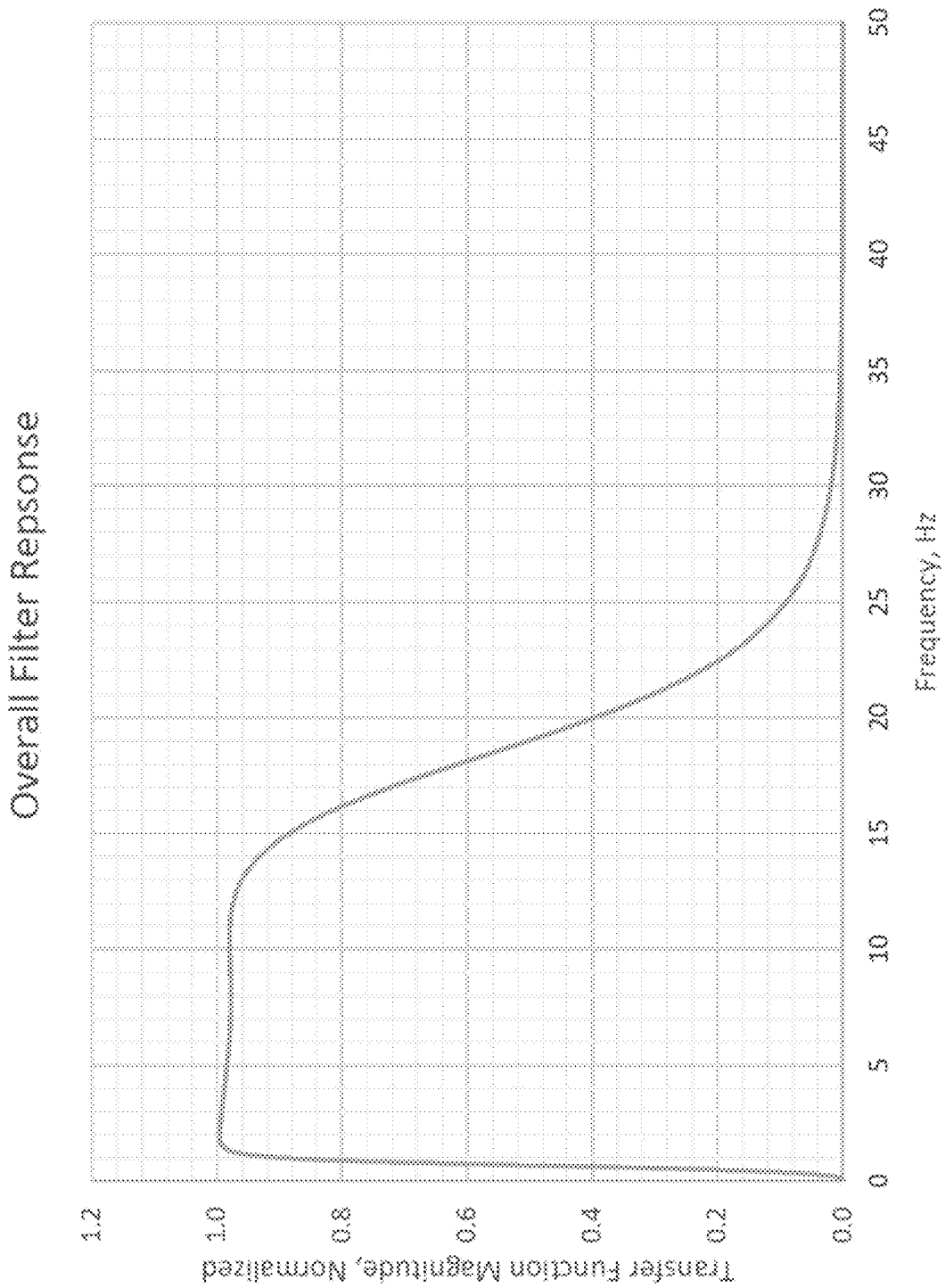
FIG. 17 is a graph illustrating a digital filter response according to embodiments of the present disclosure.

This section describes the operation of routines that handle digital filtering of seismic activity data. Filter parameters may be selected to give a relatively flat unity gain response from about 2 Hz to about 12 Hz. This may be accomplished by a series of three digital filters in series (e.g., a low pass filter, a decimation filter, and finally a bandpass filter). An illustrative frequency response of the three filters is shown in FIG. 17.

The low pass filter may be a dual biquad filter with fixed coefficients as represented in Table 7 below.

TABLE 7

Low pass filter coefficients.

| Coefficient | Biquad 1 Value | Biquad 2 Value |
|---|---|---|
| A0 | 1.00000000 | 1.00000000 |
| A1 | −1.71850586 | −0.79208374 |
| A2 | 0.80163574 | 0.00000000 |
| B0 | 0.03198242 | 0.14916992 |
| B1 | −0.00604248 | 0.14916992 |
| B2 | 0.03198242 | 0.00000000 |

The decimation filter may provide a fixed decimation of 4. Only one sample may be passed though for every 4 input values.

The bandpass filter may be accomplished with three biquad filters with fixed coefficients as represented in Table 8 below.

TABLE 8

Band pass filter coefficients.

| Coefficient | Biquad 1 Value | Biquad 2 Value | Biquad 2 Value |
|---|---|---|---|
| A0 | 1.00000000 | 1.00000000 | 1.00000000 |
| A1 | −0.63998342 | −1.94960594 | −1.21865964 |
| A2 | 0.41097558 | 0.95226717 | 0.25832224 |
| B0 | 0.29451239 | 0.52745152 | 0.42820668 |
| B1 | 0.00000000 | 0.00000000 | 0.00000000 |
| B2 | −0.29451239 | −0.52745152 | −0.42820668 |

The filter algorithm used may be a standard digital biquad filter with the following transfer function:

$$H(z) = \frac{b_0 + b_1 z^{-1} + b_2 z^{-2}}{1 + a_1 z^{-1} + a_2 z^{-2}}$$

This may be computed in practice in the following way using an X and Y array for time shifted data and the A and B coefficients mentioned above.

```
Static float X[3] = {0}; //Create the static X and Y arrays and clear them
Static float Y[3] = {0};
X[2] = X[1]; //Time shift the X array
X[1] = X[2];
X[0] = Input //Introduce the new incoming data
Y[2] = Y[1]; // Time shift the y array
Y[1] = Y[0];
Y[0] = (B0 * X[0]) + (B1 * X[1]) + (B2 * X[2]) − (A1 * Y[1]) − (A2 * Y[2]);
    //Calculate new output
Return Y[0]; //Return the new output value
```

In the LowPass and the BandPass functions, this algorithm may be expanded by using multidimensional arrays for X and Y. The second dimension allows storage of multiple arrays specific to the filter ID passed to the function when called. This allows multiple filters to be processed using a commonly called function. When this method is used, the caller should assert the correct filterID to assure data from one filter does not interfere with the other filters.

Static float X[3,9]={0}; //Create the static X and Y arrays and clear them
  Static float Y[3,9]={0}; //First dimension is time shift, second is filter ID
  output=filterLowPass(input, 2) //Processes new data in filter #2

When the BandPass function is called, the new output value may be compared to a stored minimum value and maximum value for the given channel and all three axis. If the new value is below the minimum value, the minimum values may be replaced with the new value. If the new value is above the maximum value, the maximum value may be replaced with the new value. A Clear function may reset all channels and axis minimum values to 99.0 and maximum values to 0.0. A MinMax function may be used to access the stored values.

A SSRS display may capture the maximum filtered values from the RSP any time a seismic trip alarm is indicated. This data may be added to the alarm time-stamp data and may be displayed as part of the alarm message on the SSRS display.

Set Point Comparator

A set point comparator may conduct a comparison of the filtered g-force data with the g-force limit set point(s) to determine if a seismic trip should occur. The comparison of the set point to the g-force data can occur in many ways depending on system configuration settings and current system conditions.

Various trip comparison modes may be specified by the system trip mod setting. In a vector sum comparison mode (e.g., TRIP_MODE=0), filtered X, Y, and Z amplitudes may be vector summed to calculate the maximum g-force independent of directionality. The equation used to calculate the vector sum is:

$$Sum=\sqrt{X^2+Y^2+Z^2}$$

where X, Y, and Z are the magnitude of force in the respective axis. In a maximum value comparison mode (e.g., TRIP_MODE=1), filtered X, Y, and Z amplitudes may be compared and the maximum value may be selected for comparison to a set point. In an independent value comparison mode (e.g., TRIP_MODE=2), filtered X, Y, and Z amplitudes may be compared to separate X, Y, and Z set point values, allowing a different response to each axis.

The SS may have the unique ability to perform XooX (X out of X) logic due to having three redundant accelerometers within the SS. The XooX logic allows the end user to trade the selection of spurious trip reduction against must trip conditions. A XooX_MODE system setting can be set to any of the values represented in Table 9 below.

TABLE 9

XooX modes.

| XooX_MODE | XooX_MODE Value | Function |
|---|---|---|
| 1oo3 | 0 | 1 out of 3 to trip |
| 2oo3 | 1 | 2 out of 3 to trip |
| 3oo3 | 2 | 3 out of 3 to trip |

A failed accelerometer channel may be treated as a tripped channel. An accelerometer channel can fail due to loss of communications, corrupted SPI port registers, and/or data integrity issues. If the data acquisition process is unable to clear the issue, the accelerometer channel may be taken off-line and set to a fault state. Any faulted accelerometer channel may be treated as a tripped channel by the XooX logic.

Non-Volatile Storage

FLASH memory may be used to store configuration settings, set points, and calibration data that may be desired to remain unchanged during loss of power, but allow the user to change them while in Service Mode. These values may be significant to the correct operation of the system and, thus, may require additional protections to ensure the values are unchanged except when purposefully modified by the user. To do this, the values may be saved with a CRC value that can be used to validate the data integrity when retrieving the data from FLASH memory. The MCUs EEC component ensures the data integrity of individual memory cells, but may not address the integrity of the entire set point/configuration database. Thus, an additional protection of the CRC check my be warranted.

One possible source of corruption is the loss of power while writing new values to the FLASH memory. This may result in an error that can be detected by the EEC component. To prevent the possibility of the EEC component not detecting the error, the CRC check may be completed on the entire database each time the data is recovered from FLASH memory and placed in RAM. This CRC check may also be completed on the RAM image of the database periodically to ensure the RAM image is not damaged. If the RAM image is found to be corrupted, a new copy of the FLASH database may be recovered. If the FLASH database is also found to be corrupted, a critical fault may be generated and the system may fail safe by turning off the fault output relays.

When the set points, configurations, and/or calibration data are changed by the user while in the SERVICE Mode, a new CRC value may be calculated and saved with the updated settings. Settings made by the user while in Service Mode may be made to a duplicate RAM database where they are held until the user explicitly instructs the SS to make the changes to the FLASH database. Once the FLASH database is updated, a message may be sent back to the user indicating the update was successful and the new values are transferred to the active database where they are used once the system returns to the SAFETY Mode. If the SERVICE Mode returns to SAFETY Mode prior to the user manually commanding the storing of the new values to FLASH memory, the new changes may be discarded.

The FLASH memory reads and writes may be limited to a specific FLASH memory bank that is set aside specifically for this type of end user storage. This limits the possibility of the database values being written into the program storage locations and potentially corrupting the program code. Access to the FLASH may be handled through F201 Flash APIs as described above.

Additional protections may be provided to the set points, configurations, and/or calibration data RAM database by only allowing access to the values though specific functions. These functions may allow read only access to the active database values. Write functions may be allowed to the temporary copy of the database, but only while in the SERVICE Mode. The temporary database may be moved to FLASH and then back to the RAM database from the new FLASH database.

In addition to the set points, configuration data, and calibration data, a separate area in FLASH may be reserved to store a number of power up cycles and total run hours. These values may not be CRC protected and may be updated once every about 6 minutes (e.g., 1/10 hour).

The set point and configuration values may be stored in the database in a specific format. An illustrative format is provided in Table 10 below.

TABLE 10

Set point/configuration database.

| Index | SP/CONFIG | ID | Description | Range | Bytes | Offset | Format |
|---|---|---|---|---|---|---|---|
| 0 | SP | COMB_TRIP | Combined Axis Trip SP | 0.000-3.000 | 4 | 0 | float32 |
| 1 | SP | X_TRIP | X-Axis Trip SP | 0.000-3.000 | 4 | 4 | float32 |
| 2 | SP | Y_TRIP | Y-Axis Trip SP | 0.000-3.000 | 4 | 8 | float32 |
| 3 | SP | X_TRIP | Z-Axis Trip SP | 0.000-3.000 | 4 | 12 | float32 |
| 4 | SP | TRIP_DLY | Trip Delay SP | 0.00-30.00 | 4 | 16 | float32 |
| 5 | SP | LOW_VOLT | Low Voltage Trip SP | 0.0-30.0 | 4 | 20 | float32 |
| 0 | CONFIG | XooX_MODE | XooX Logic Mode | 0 = 1oo3<br>1 = 2oo3<br>2 = 3oo3 | 2 | 24 | uint16 |
| 1 | CONFIG | TRIP_MODE | Trip Mode Selection | 0 = Vector<br>1 = Maximum<br>2 = Independent | 2 | 26 | uint16 |
| 2 | CONFIG | FAST_TEST | Fast Relay Test Enable | 0 = Disabled<br>1 = Enabled | 2 | 28 | uint16 |
| 3 | CONFIG | UNIT_SN | Unit Serial Number | 0 to 32767 | 2 | 30 | uint16 |
| 4-27 | CONFIG | PASSWORD | Service Mode Password | Printable ASCII characters (32 to 126) | 48 | 32 | uint16[24] |
| 28 | CONFIG | SU_TRIP_MODE | Start Up Trip Mode | 0 = Normal<br>1 = Tripped | 2 | 80 | uint16 |
| 0 | CAL | ACC1_X_NEG | The accelerometer 1, X-axis – one g value | −235,520 to −276,480 | 4 | 82 | sint32 |
| 1 | CAL | ACC1_Y_NEG | The accelerometer 1, Y-axis – one g value | −235,520 to −276,480 | 4 | 86 | sint32 |
| 2 | CAL | ACC1_Z_NEG | The accelerometer 1, Z-axis – one g value | −235,520 to −276,480 | 4 | 90 | sint32 |
| 3 | CAL | ACC2_X_NEG | The accelerometer 2, X-axis – one g value | −235,520 to −276,480 | 4 | 94 | sint32 |
| 4 | CAL | ACC2_Y_NEG | The accelerometer 2, Y-axis – one g value | −235,520 to −276,480 | 4 | 98 | sint32 |
| 5 | CAL | ACC2_Z_NEG | The accelerometer 2, Z-axis – one g value | −235,520 to −276,480 | 4 | 102 | sint32 |
| 6 | CAL | ACC3_X_NEG | The accelerometer 3, X-axis – one g value | −235,520 to −276,480 | 4 | 106 | sint32 |
| 7 | CAL | ACC3_Y_NEG | The accelerometer 3, Y-axis – one g value | −235,520 to −276,480 | 4 | 110 | sint32 |
| 8 | CAL | ACC3_Z_NEG | The accelerometer 3, Z-axis – one g value | −235,520 to −276,480 | 4 | 114 | sint32 |
| 9 | CAL | ACC1_X_POS | The accelerometer 1, X-axis + one g value | 235,520 to 276,480 | 4 | 118 | sint32 |
| 10 | CAL | ACC1_Y_POS | The accelerometer 1, Y-axis + one g value | 235,520 to 276,480 | 4 | 122 | sint32 |
| 11 | CAL | ACC1_Z_POS | The accelerometer 1, Z-axis + one g value | 235,520 to 276,480 | 4 | 126 | sint32 |
| 12 | CAL | ACC2_X_POS | The accelerometer 2, X-axis + one g value | 235,520 to 276,480 | 4 | 130 | sint32 |
| 13 | CAL | ACC2_Y_POS | The accelerometer 2, Y-axis + one g value | 235,520 to 276,480 | 4 | 134 | sint32 |
| 14 | CAL | ACC2_Z_POS | The accelerometer 2, Z-axis + one g value | 235,520 to 276,480 | 4 | 138 | sint32 |
| 15 | CAL | ACC3_X_POS | The accelerometer 3, X-axis + one g value | 235,520 to 276,480 | 4 | 142 | sint32 |
| 16 | CAL | ACC3_Y_POS | The accelerometer 3, Y-axis + one g value | 235,520 to 276,480 | 4 | 146 | sint32 |
| 17 | CAL | ACC3_Z_POS | The accelerometer 3, Z-axis + one g value | 235,520 to 276,480 | 4 | 150 | sint32 |
| NA | NA | CRC | The Database CRC | | 8 | 154 | uint64 |

Self-Diagnostics

A SS of the present disclosure is configured to detect errant operations and to inform external systems of this condition. To do this, the SS may use a combination of hardware and software to routinely test for normal operations. The following relates to the performance of such tests and the reporting of issues to a local system and SSRS display. The following may be performed during the diagnostic phase of the RTOS cycle.

The diagnostic phase may have a limited amount of time to perform its test before returning to the RTOS. When diagnostic phases require more than an allotted time, the diagnostic phases may be split into smaller sections that can be performed one per cycle to create the complete test. A RTOS variable diagIndex may be used to keep track of which diagnostic function should be performed next. The value may increment every RTOS cycle until it reaches 400 where it rolls back to 0. This allows for 400 different diagnostic functions to be completed within the RSP one second update rate.

There are a few diagnostic functions that may "trap" the entire system. Tests that indicate that the CPU is unable to perform correctly may enter tight, never ending loops that hold the CPU in the diagnostic function indefinably. The watchdog system fails the output relays off in these conditions, taking the system to the fail-safe state. A SSRS display will indicate a loss of communication in these cases, but may not provide the reason why.

The diagnostic function may be handled in a diagMain( ) function. The RTOS may call the diagMain( ) function at the start of the diagnostic phase and provide the diagIndex value so the diagMain( ) function knows which diagnostic to perform. The diagMain( ) function may then select the correct code or sub-function to perform the actual diagnostic.

A list of sub-functions and their order are provided in Table 11 below. The Fault Type column indicates the fault type for a failure of the particular diagnostic. The word "TRAP" is placed in the Fault Type column if the function can trap the system due to a significant hardware failure. The word "Critical" indicates a fault that forces the system to the fail-safe mode while allowing the MCU to continue normal operations. Other types of faults listed are warning message and channel faults. Items marked in italics are tasks that continue to operate in the SERVICE mode.

An accelerometer self-test may be scheduled in every RTOS super cycle. The accelerometer self-test may be limited by the self-test diagnostic function to only execute the self-test every 10 minutes. When this diagnostic is performed, the acquisition of data for the accelerometer of the tested channel may be blanked for two RTOS cycles. The X, Y, and Z axis values from the previous acquisition may be held to prevent the filters and comparator from seeing an acceleration offset created by the self-test. Only one channel may be blanked at a time, while the remaining un-blanked channels operate normally. The missing data points every 10 minutes (2 points out of 240,000 samples) has negligible effect on seismic detection capability.

TABLE 11

Diagnostic tasks.

| Index | Affected RSP Values | Diagnostic Task | Fault Type |
|---|---|---|---|
| 1 | | Turn on the Green operations indicator light | |
| 2 | ANALOG(23) - (25) | Transfer snap shot values from Accelerometer 1 | |
| 3 | ANALOG(26) - (28) | Transfer snap shot values from Accelerometer 2 | |
| 4 | ANALOG(29) - (31) | Transfer snap shot values from Accelerometer 3 | |
| 5 | ALARM (5), (11), (17), (21), (22), (23), WARNING(72) | Clear alarms set by other functions ACC Communication Faults and Watchdog Count faults | |
| 6 | | Call service mode handler | |
| 7 | ALARM(48) | Check the ESM for ADC parity errors | Critical |
| 8 | ALARM(87) | Perform the ADC midpoint Calibration. Check for out of tolerance midpoint calibration values. Clear the analog averaging variables back to a value of zero prior to starting new averages | Critical |
| 9 | | Set the power supply analog MUX to VDD5 signal input | |
| 10 | ANALOG(3) | Start the ADC conversion of all analog inputs and places the VDD5 value in RSP, | |
| 11 | | Read the analog values in from the ADC, add ADC values for averaging into averaging variables | |
| 12 | | Set the power supply analog MUX to VDD6 signal input | |
| 13 | ANALOG(1) | Start the ADC conversion of all analog inputs and places the VDD6 value in RSP, | |
| 14 | | Read the analog values in from the ADC, add ADC values for averaging into averaging variables | |
| 15 | | Set the power supply analog MUX to VCP signal input | |
| 16 | ANALOG(2) | Start the ADC conversion of all analog inputs and places the VCP value in RSP, | |
| 17 | | Read the analog values in from the ADC, add ADC values for averaging into averaging variables | |

TABLE 11-continued

Diagnostic tasks.

| Index | Affected RSP Values | Diagnostic Task | Fault Type |
|---|---|---|---|
| 18 | | Set the power supply analog MUX to VSOUT1 signal input | |
| 19 | ANALOG(4) | Start the ADC conversion of all analog inputs and places the VSOUT value in RSP, | |
| 20 | | Read the analog values in from the ADC, add ADC values for averaging into averaging variables | |
| 21 | | Set the power supply analog MUX to VBATP signal | |
| 22 | | Start the ADC conversion of all analog inputs and store the VBATP value for use in index 89 | |
| 23 | | Read the analog values in from the ADC, add ADC values for averaging into averaging variables | |
| 24 | | Set the power supply analog MUX to MAIN_BG signal | |
| 25 | ANALOG(13) | Start the ADC conversion of all analog inputs and places the MAIN_BG value in RSP, | |
| 26 | | Read the analog values in from the ADC, add ADC values for averaging into averaging variables | |
| 27 | | Set the power supply analog MUX to VMON_BG signal | |
| 28 | ANALOG(14) | Start the ADC conversion of all analog inputs and places the VMON_BG value in RSP, | |
| 29 | | Read the analog values in from the ADC, add ADC values for averaging into averaging variables | |
| 30 | ANALOG(5) | Calculate 3.3 V relay enable voltage average value and place in RSP | |
| 31 | ANALOG(6) | Calculate 1.2 V MCU core supply voltage average value and place in RSP | |
| 32 | ANALOG(7) | Calculate 1.8 V Accel 1 digital supply voltage average value and place in RSP | |
| 33 | ANALOG(8) | Calculate 1.8 V Accel 1 analog supply voltage average value and place in RSP | |
| 34 | ANALOG(9) | Calculate 1.8 V Accel 2 digital supply voltage average value and place in RSP | |
| 35 | ANALOG(10) | Calculate 1.8 V Accel 2 analog supply voltage average value and place in RSP | |
| 36 | ANALOG(11) | Calculate 1.8 V Accel 3 digital supply voltage average value and place in RSP | |
| 37 | ANALOG(12) | Calculate 1.8 V Accel 3 analog supply voltage average value and place in RSP | |
| 38 | WARNING(14), (15), (18), (19), (22), (23) | Compare Accel 1 to 3 - 1.8 V digital supply voltage to Low and High set point | Warning |
| 39 | WARNING(16), (17), (20), (21), (24), (25) | Compare Accel 1 to 3 - 1.8 V analog supply voltage to Low and High set point | Warning |
| 40 | ALARM(25), (26), (29), (30), (33), (34) | Compare Accel 1 to 3 - 1.8 V digital supply voltage to Low-Low and High-High set point | Channel Fault |
| 41 | ALARMS(27), (28), (31), (32), (35), (36) | Compare Accel 1 to 3 - 1.8 V analog supply voltage to Low-Low and High-High set point | Channel Fault |
| 42 | ANALOG(15) | Calculate seismic relay A drive current average value and place in RSP | |
| 43 | ANALOG(16) | Calculate seismic relay B drive current average value and place in RSP | |
| 44 | ANALOG(17) | Calculate fault relay A drive current average value and place in RSP | |
| 45 | ANALOG(18) | Calculate fault relay B drive current average value and place in RSP | |
| 46 | ANALOG(19) | Calculate low voltage relay drive current average value and place in RSP | |
| 47 | | Call service mode handler | |
| 48 | ALARM(37) | Compare seismic relay A drive current to commanded off state | Critical |
| 49 | WARNING(40) | Compare seismic relay A drive current to commanded on state | Warning |
| 50 | ALARM(38) | Compare seismic relay B drive current to commanded off state | Critical |

TABLE 11-continued

Diagnostic tasks.

| Index | Affected RSP Values | Diagnostic Task | Fault Type |
|---|---|---|---|
| 51 | WARNING(41) | Compare seismic relay B drive current to commanded on state | Warning |
| 52 | ALARM(39) | Compare fault relay A drive current to commanded off state | Critical |
| 53 | WARNING(42) | Compare fault relay A drive current to commanded on state | Warning |
| 54 | ALARM(40) | Compare fault relay B drive current to commanded off state | Critical |
| 55 | WARNING(43) | Compare fault relay B drive current to commanded on state | Warning |
| 56 | WARNING(30) | Compare seismic relay A drive current to Low limit | Warning |
| 57 | WARNING(31) | Compare seismic relay A drive current to High limit | Warning |
| 58 | WARNING(32) | Compare seismic relay B drive current to Low limit | Warning |
| 59 | WARNING(33) | Compare seismic relay B drive current to High limit | Warning |
| 60 | WARNING(34) | Compare fault relay A drive current to Low limit | Warning |
| 61 | WARNING(35) | Compare fault relay A drive current to High limit | Warning |
| 62 | WARNING(36) | Compare fault relay B drive current to Low limit | Warning |
| 63 | WARNING(37) | Compare fault relay B drive current to High limit | Warning |
| 64 | WARNING(38) | Compare low voltage relay drive current to Low limit | Warning |
| 65 | WARNING(39) | Compare low voltage relay drive current to High limit | Warning |
| 66 | WARNING(45) | Compare low voltage relay drive current to commanded off state | Warning |
| 67 | WARNING(44) | Compare low voltage relay drive current to commanded on state | Warning |
| 68 | WARNING(46) | Compare 3V3EN (Relay Enable) voltage to commanded on state | Warning |
| 69 | ANALOG(20) TO (22) | Transfer Accel 1 to 3 temperature data to RSP | |
| 70 | WARNING(47) TO (52) | Compare Accel 1 to 3 temperatures to Low and High set point | Warning |
| 71 | ALARM(42) TO (47) | Compare Accel 1 to 3 temperatures to Low-Low and High-High set point | Channel Fault |
| 72 | ALARM (21) | Check for power supply failure to respond Start the power supply configuration CRC check | Critical |
| 73 | ALARM (72) | Get results of power supply configuration CRC test Start the power supply EEPROM CRC check | Critical |
| 74 | ALARM (73) | Get results of power supply EEPROM CRC test | Critical |
| 75 | WARNING (5), (7), (8), (9) | Decode SAFETY_STAT_1 Bit 2 -> (7): 3V3AUX Over Temp Bit 4 -> (9): 3V3AUX Over Voltage Bit 5 -> (8): 3V3AUX Under Voltage Bit 6 -> (5): 3V3 Over Current | Warning |
| 76 | WARNING (2), (3), (4), (5), (12), (13) | Decode VMON_STAT_1 Bit 3 -> (4) VCP12 Under Voltage Decode VMON_STAT_2 Bit 0 -> (12): 1V2 Under Voltage Bit 1 -> (13): 1V2 Over Voltage Bit 3 -> (6): 3V3 Over Voltage Bit 6 -> (2): VDD6 Under Voltage Bit 7 -> (3): VDD6 Over Voltage | Warning |
| 77 | ALARM (22), (22), (23), (24), (74) | Decode SAFETY_STAT_3 Bit 3 -> (24): ABIST Error Bit 4 -> (24): LBIST Error Decode SAFETY_STAT_4 Bit 1 -> (74): ENDRV pin error Bit 2 -> (22): Watchdog failed Bit 6 -> (24): SPI output pin error Decode SAFETY_STAT_5 Any value other than ACTIVE (0x05) -> (23): Power supply mode wrong | Critical |
| 78 | WARNING(10), (11) | Compare 3V3EN relay enable power supply to Low and High Set point | Warning |

TABLE 11-continued

Diagnostic tasks.

| Index | Affected RSP Values | Diagnostic Task | Fault Type |
|---|---|---|---|
| 79 | | Spare | |
| 80 | | Start clock comparison for error:<br>Main XTAL Osc and LPO HS Osc (3% Error Limit)<br>Main XTAL Osc and VCLK1 (1% Error Limit) | |
| 81 | WARNING(53)<br>WARNING(54) | Get results of clock comparison | Warning |
| 82 | | Start clock comparison for clock error:<br>Main XTAL Osc and LPO HS Osc<br>Main XTAL Osc and VCLK1 | |
| 83 | ANALOG(59)<br>ANALOG(60) | Get results of clock comparison error and place in RSP | |
| 84 | WARNING(65)<br>WARNING(66)<br>WARNING(67) | Check ESM for correctable memory fault, service port parity error or remote status port parity error | Warning |
| 85 | NONE - RSP cannot be transmitted in Limp mode | Check global status register for failed clock - System running in limp mode | Critical |
| 86 | | Spare | |
| 87 | WARNING(68) | Check remote reset for seismic trip reset edge trigger | Warning |
| 88 | WARNING(70) | Check for stuck remote reset input | Warning |
| 89 | ALARM (2)<br>ANALOG(0) | Adjust input voltage for input diode voltage drop<br>Check for low voltage power supply input conditions, set/clear low voltage relay. | Low Voltage |
| 90 | WARNING(0), (1) | Set low/high power supply input voltage warnings | Warning |
| 91 | ALARM (3) | Check ESM for Accel 1 SPI port parity fault | Channel Fault |
| 92 | ALARM (9) | Check ESM for Accel 2 SPI port parity fault | Channel Fault |
| 93 | ALARM (15) | Check ESM for Accel 3 SPI port parity fault | Channel Fault |
| 94 | | Call service mode handler | |
| 95 | | Spare cycle | |
| ... | | Spare cycles | |
| 120 | | Spare cycle | |
| 121 | ANALOG (32)-(34) | Transfer Accel 1 maximum, X, Y and Z | |
| 122 | ANALOG (35)-(37) | Transfer Accel 2 maximum, X, Y and Z | |
| 123 | ANALOG (38)-(40) | Transfer Accel 3 maximum, X, Y and Z | |
| 124 | ANALOG (41)-(43) | Transfer Accel 1 minimum, X, Y and Z | |
| 125 | ANALOG (44)-(46) | Transfer Accel 2 minimum, X, Y and Z | |
| 126 | ANALOG (47)-(49) | Transfer Accel 3 minimum, X, Y and Z | |
| 127 | | Clear ACC1 to 3 unfiltered min and max values | |
| 128 | ANALOG (50)-(52), (66) | Transfer Accel 1 filtered maximum, X, Y and Z | |
| 129 | ANALOG (53)-(55), (67) | Transfer Accel 2 filtered maximum, X, Y and Z | |
| 130 | ANALOG (56)-(58), (68) | Transfer Accel 3 filtered maximum, X, Y and Z | |
| 131 | | Clear accelerometer filtered min and max values | |
| 132 | DIGITAL (0)-(20) | Transfer values for DIGITAL (0) to (20) to RSP | |
| 133 | WARNING(69) | Clears power up warning flag after 60 seconds of run time. | |
| 134 | | Spare | |
| 135 | | On first call after reset/power up only - retrieves update from EEPROM storage for run hours and power up count | |
| 136 | | Updates run hour accumulation and stores to FLASH every 6 minutes | |
| 137 | ANALOG (61), (62) | Transfer runs hours to RSP | |
| 138 | ANALOG (63), (64), (65) | Transfer power up count, SW version and SN to RSP | |
| 139 | | Update timer for Accelerometer self-tests | |
| 140 | | Start Accel 1 Positive Self-test, Set channel blanking (executed every 10 minutes) | |
| 141 | | Start Accel 1 Negative Self-test, Set channel blanking (executed every 10 minutes) | |

TABLE 11-continued

Diagnostic tasks.

| Index | Affected RSP Values | Diagnostic Task | Fault Type |
|---|---|---|---|
| 142 | ALARM (7) | Complete Accel 1 Self-test | Channel Fault |
| 143 | | Start Accel 2 Positive Self-test, Set channel blanking (executed every 10 minutes) | |
| 144 | | Start Accel 2 Negative Self-test, Set channel blanking (executed every 10 minutes) | |
| 145 | ALARM (13) | Complete Accel 2 Self-test | Channel Fault |
| 146 | | Start Accel 3 Positive Self-test, Set channel blanking (executed every 10 minutes) | |
| 147 | | Start Accel 3 Negative Self-test, Set channel blanking (executed every 10 minutes) | |
| 148 | ALARM (19) | Complete Accel 3 Self-test | Channel Fault |
| 149 | ALARM (75) | Fast relay test (if enabled) | Critical |
| 150 | | Start CRC calculation for program storage FLASH bank | |
| 151 | WARNING(71) | Compare FLASH program bank CRC to golden value. Warning on DMA cycle not completed, Trap on bad CRC value. | TRAP |
| 152 | WARNING (60) | Check RAM set point database CRC | Warning |
| 153 | ALARM (48) | Recover set point database from FLASH if needed, Flag if failed | Critical |
| 154 | | Call service mode handler | |
| 155 | | Spare cycle | |
| ... | | Spare cycles | |
| 174 | | Spare cycle | |
| 175 | | Call TI_FEE_MainFunction( ) to allow background update of EEPROM emulator | Extended RTOS Allowed |
| 176 | | Idle cycle to allow for extended RTOS recovery | |
| 177 | | Spare cycle | |
| ... | | Spare cycles | |
| 198 | | Spare cycle | |
| 199 | | Turn off Green operations indicator | |
| 200 | | Call service mode handler | |
| 201 | ALARM(79) | Check the ESM for DMA Memory Protection Unit fault (ESM Group 1, Channel 2) | Critical |
| 202 | ALARM(80) | Check the ESM for DMA parity error (ESM Group 1, Channel 3) | Critical |
| 203 | ALARM(81) | Check the ESM for DMA imprecise read error (ESM Group 1, Channel 5) | Critical |
| 204 | ALARM(82) | Check the ESM for N2HET1/2 parity error (ESM Group 1, Channel 8) | Critical |
| 205 | ALARM(83) | Check the ESM for VIM parity error (ESM Group 1, Channel 15) | Critical |
| 206 | ALARM(84) | Check the ESM for EEPROM Uncorrectable error (ESM Group 1, Channel 36) | Critical |
| 207 | ALARM(85) | Check the ESM for Power domain controller compare error (ESM Group 1, Channel 38) | Critical |
| 208 | | Calculate and send multiplexed setpoint data to RSP | |
| 209 | | Spare cycle | |
| ... | | Spare cycles | |
| 249 | | Spare cycle | |
| 250 | | Call service mode handler | |
| 251 | | Special SW test case - Allows extended diagMain timing during software testing | |
| 252 | | Spare cycle | |
| ... | | Spare cycles | |
| 299 | | Spare cycle | |
| 300 | | Call service mode handler | |
| 350 | | Call service mode handler | |
| 351 | | Spare cycle | |
| ... | | Spare Cycles | |
| 397 | | Spare cycle | |
| 398 | | Start CRC calculation for newly formed RSP | |
| 399 | | Flip ping-pong buffer and start new RSP transmission Roll diagnostic index back to 0 | |
| 400+ | ALARM(76) | Invalid index - Problem with RTOS | Critical |

Service Mode

SERVICE mode allows the user to stop the normal safety function and enter a mode that allows set point changes, configuration changes, and/or manual manipulation of SS outputs for testing purposes and calibration functions. To enter the SERVICE mode, the user may be required to enter a correct password. Once entered and verified, the user may be given a choice to enter the SERVICE mode or remain in SAFETY mode and logout. When entering the SERVICE mode, current relay positions may be maintained, thus allowing the user to enter the SERVICE mode without interrupting current system operation.

When the SERVICE mode is entered, the SAFETY mode may be exited and seismic activity monitoring, low voltage monitoring, and at least some fault monitoring may be disabled until the user manually exits the service mode, the service mode times out, or power is cycled to the system. The SS's software may replace most of the scheduled safety and fault monitoring tasks with the SERVICE mode task for the duration of the SERVICE mode.

Changes made to set points, configurations, and calibrations may be stored in RAM until the user selects menu options that write the values to FLASH. If the user fails to save the values to FLASH before exiting, the system may issue a warning message that values were not saved to FLASH and were discarded.

Calibrations of accelerometers may be permitted while in the SERVICE mode. A calibration menu may allow selection of one of the SS's accelerometers for calibration. The SS may be physically tilted to create zero and one g values and the user may select a menu option for the correct axis and value to store the value to RAM. Values for the selected accelerometer may be shown in real time to aid in calibration. Values may be given in raw counts with a range of about −524288 to about +524287, representing +/−2.048 g.

Software used for the SERVICE mode may operate as a state machine where the state of the machine represents the current menu the operator is at. The state machine may start at state 0 and then progress through other states as the operator selects various menu selections. States 0 to 7 may be allowed while the system is in SAFETY Mode. All other states may only be allowed after the SAFETY Mode has been exited. If an unknown state is entered, the system may log off the user, print an error message, exit the SERVICE Mode, and restart the SAFETY Mode. Illustrative SERVICE mode states are listed in Table 12 below.

While the SERVICE mode is in any mode greater than 7, a timer (e.g., a 10 minute timer) may be started. If the timer reaches the time limit, the system may log off the user, print an error message, exit the SERVICE mode, and restart SAFETY Mode. Any time the system is in a wait for user input mode and a keystroke is received, this time out timer may be reset.

Messages and prompts that are used by the SERVICE mode may be stored in a multidimensional constant array. A servicePrintMessage( ) function may be used to transmit the selected message via the service serial port. Message strings may be terminated with a null (0x00) character. With the exception of password entry, all user commands may consist of a single key press. A serviceGetKey( ) function may be used to retrieve keystrokes from the service serial port using polling. The SCI port may have a single level receive buffer. Thus, it may be beneficial for the port to be serviced regularly to ensure input characters are not lost.

TABLE 12

Service mode state machine modes.

| State | Section | Menu/Function | Next State |
|---|---|---|---|
| 0 | Pre-Service | Idle, waiting for serial port connection | 0—No connection<br>1—Connected |
| 1 | Pre-Service | Serial port connected, Wait for ESC character | 0—No connection<br>2—ESC received |
| 2 | Logon | Print password prompt | 3—Prompt printed |
| 3 | Logon | Wait for user to enter password | 2—ESC received<br>3—Next character<br>4—Enter received |
| 4 | Logon | Password validation | 5—Invalid password<br>6—Valid password |
| 5 | Logon | Print password failed | 2—Print completed |
| 6 | Service Entry | Print warning and service mode entry menu | 7—Print completed |
| 7 | Service Entry | Wait for user input | 8—A) Enter service mode<br>2—B) Logout<br>6—Any other key |
| 8 | Main Menu | Print main menu | 9—Print completed |
| 9 | | Wait for user input | 10—A) Clear trip<br>11—B) Hardware test<br>15—C) Set points<br>21—D) Configuration<br>32—E) Change Password<br>47—F) Store to flash<br>54—G) Watchdog fault<br>57—H) Print configuration<br>59—I) Calibrate<br>66—J) Exit with hold<br>68—K) Exit without hold<br>8—Any other key |
| 10 | Clear Trip | Clear the tip state | 8—trip state cleared |
| 11 | Hardware | Print hardware test menu—page 1 | 12—Print completed |
| 12 | Hardware | Wait for user input | 12—A) to J) Set output<br>13—K) More Options |

TABLE 12-continued

Service mode state machine modes.

| State | Section | Menu/Function | Next State |
|---|---|---|---|
| | | | 8—Z) Main menu |
| | | | 11—Any other key |
| 13 | Hardware | Print hardware test menu—page 2 | 14—Print completed |
| 14 | Hardware | Wait for user input | 14—A) to D) Set output |
| | | | 8—Z) Main menu |
| | | | 13—Any other key |
| 15 | Hardware | Print set point menu | 16—Print completed |
| 16 | Hardware | Wait for user input | 17—A) to F) Select set point |
| | | | 8—Z) Main menu |
| | | | 15—Any other key |
| 17 | Set Point | Print selected set point prompt and change menu | 18—Print completed |
| 18 | Set Point | Wait for user input | 19—A) to D) Change set point |
| | | | 20—F) Main menu - keep |
| | | | 8—Z) Main menu - revert |
| | | | 17—Any other key |
| 19 | Set Point | Print updated value display | 18—Print completed |
| 20 | Set Point | Move value to RAM database | 8—Update completed |
| 21 | Configuration | Print configuration menu | 22—Print completed |
| 22 | Configuration | Wait for user input | 23—A) XooX |
| | | | 26—B) Trip Mode |
| | | | 29—C) Relay test |
| | | | 70—D) Start Up Trip Mode |
| | | | 73—E) Set SN (only if SN = 0) |
| | | | 8—Z) Main menu |
| | | | 21—Any other key |
| 23 | Configuration | Print XooX menu | 24—Print completed |
| 24 | Configuration | Wait for user input | 25—A) to C) Change setting |
| | | | 8—Z) Main menu |
| | | | 23—Any other key |
| 25 | Configuration | Move new value to RAM database | 21—Update completed |
| 26 | Configuration | Print trip mode menu | 27—Print completed |
| 27 | Configuration | Wait for user input | 28—A) to C) Change setting |
| | | | 8—Z) Main menu |
| | | | 26—Any other key |
| 28 | Configuration | Move new value to RAM database | 21—Update completed |
| 29 | Configuration | Print fast relay test mode menu | 30—Print completed |
| 30 | Configuration | Wait for user input | 31—A) to B) Change setting |
| | | | 8—Z) Main menu |
| | | | 29—Any other key |
| 31 | Configuration | Move new value to RAM database | 21—Update completed |
| 32 | PW Change | Print change password mode menu | 33—Print completed |
| 33 | PW Change | Print enter current password prompt | 34—Print completed |
| 34 | PW Change | Wait for user input | 8—ESC received |
| | | | 34—Next character |
| | | | 35—Enter received |
| 35 | PW Change | Password validation | 36—Invalid password |
| | | | 37—Valid password |
| 36 | PW Change | Print password failed—hit any key | 8—Any key |
| 37 | PW Change | Print enter new password prompt 1 | 38—Print completed |
| 38 | PW Change | Wait for user input | 8—ESC received |
| | | | 38—Next character |
| | | | 39—Enter received |
| 39 | PW Change | Print enter new password prompt 2 | 40—Print completed |
| 40 | PW Change | Wait for user input | 8—ESC received |
| | | | 40—Next character |
| | | | 41—Enter received |
| 41 | PW Change | New password compare | 42—Passwords match |
| | | | 45—Passwords don't match |
| 42 | PW Change | Update password to RAM | 43—Update completed |
| 43 | PW Change | Print password changed—hit any key | 44—Print completed |

TABLE 12-continued

Service mode state machine modes.

| State | Section | Menu/Function | Next State |
|---|---|---|---|
| 44 | PW Change | Wait for user input | 8—Any key |
| 45 | PW Change | Print password change failed—hit any key | 46—Print completed |
| 46 | PW Change | Wait for user input | 8—Any key |
| 47 | FLASH Store | Print store setting menu | 48—Print completed |
| 48 | FLASH Store | Wait for user input | 49—A) Store<br>8—Z) Main menu<br>47—Any other key |
| 49 | FLASH Store | Transfer RAM values to FLASH | 50—Update Good<br>52—Update Bad |
| 50 | FLASH Store | Print FLASH update good - hit any key | 51—Print completed |
| 51 | FLASH Store | Wait for user input | 8—Any key |
| 52 | FLASH Store | Print FLASH update bad - hit any key | 53—Print completed |
| 53 | FLASH Store | Wait for user input | 8—Any key |
| 54 | Watchdog | Print watchdog warning/menu | 55—Print completed |
| 55 | Watchdog | Wait for user input | 56—A) Run Test<br>8—Z) Main menu<br>54—Any other key |
| 56 | Watchdog | Perform watchdog fault test -> Reboot | 0—Reboot |
| 57 | Print Config | Print configuration settings - hit any key | 58—Print completed<br>8—Bad sub-state detected |
| 58 | Print Config | Wait for user input | 8—Any key |
| 59 | Calibrate | Print calibration menu | 60—Print completed |
| 60 | | Wait for user input | 63—A) to C) Change ACC<br>63—D) to F) Zero Axis<br>63—G) to I) 1G Axis<br>8—Z) Main Menu<br>61—No key entered<br>59—Any other key |
| 61 | Calibrate | Check update timer | 62—Time to update<br>60—Not time to update |
| 62 | Calibrate | Print current g forces | 60—Print completed |
| 63 | Calibrate | Change ACC selected | 64—update completed |
| 64 | Calibrate | Zero Axis selected on ACC selected | 60—update completed |
| 65 | Calibrate | Set 1 g on Axis selected on ACC selected | 60—update completed |
| 66 | Exit Service | Print exit with hold message | 67—Print completed |
| 67 | Exit Service | Hold relay values, logout, exit service mode - Restart Safety Mode | 0—Exit the service mode |
| 68 | Exit Service | Print exit without hold message | 69—Print completed |
| 69 | Exit Service | Reset relay values, logout, exit service mode—Restart Safety Mode | 0—Exit the service mode |
| 70 | Configuration | Print Startup Trip Mode menu | 71—Print completed |
| 71 | Configuration | Wait for user input | 72—A) to B) Change setting<br>8—Z) Main menu<br>70—Any other key |
| 72 | Configuration | Move new value to RAM database | 21—Update completed |
| 73 | Configuration | Print change SN prompt | 74—Print Complete |
| 74 | Configuration | Wait for user input | 74—0 to 9 Change SN value<br>75—Enter |
| 75 | Configuration | Place new SN in database | 49—force update to FLASH |
| Default | Error | Invalid service state requested | 0—Service entry |

While the present disclosure has been particularly described in conjunction with specific embodiments, it is evident that many alternatives, modifications, and variations will be apparent to those skilled in the art in light of the foregoing description. It is therefore contemplated that the appended claims will embrace any such alternatives, modifications, and variations as falling within the true spirit and scope of the present disclosure.

What is claimed is:

1. A digital seismic switch, comprising:
a first processor;
a second processor, wherein the first processor and the second processor are configured to operate in lockstep and process identical data, and wherein the first and the second processor are configured to detect operational failure of the seismic switch in real time in response to a discrepancy between the first processor and the second processor;

at least one accelerometer configured to detect ground accelerations caused by seismic activity in a frequency range; and a plurality of peripheral components coupled to the first processor and the second processor, wherein each peripheral component of the plurality of peripheral components includes an error signaling component (ESM) configured to communicate fault associated with its respective peripheral component to the first and the second processors, wherein the plurality of peripheral components includes an analog to digital convertor (ADC) component configured to convert analog values to digital values, a direct memory access (DMA) component configured to control data transfer to and from other memory components, a virtual interrupt (VIM) component configured to control interrupts to the first and the second processors, and an error correct and detection component configured to validate data in a flash memory.

2. The seismic switch of claim 1, wherein the frequency range is from about direct current (DC) to about 2 KHz or from about 2 Hz to about 15 Hz.

3. The seismic switch of claim 1, wherein the at least one accelerometer is configured to provide data to a serial peripheral interface (SPI) of the second processor.

4. The seismic switch of claim 3, wherein:
the at least one accelerometer comprises a first accelerometer comprising three axis balance arms; and
the first accelerometer, when activated via the SPI, places an electrostatic charge on the three axis balance arms to simulate an acceleration signal.

5. The seismic switch of claim 1, wherein the at least one accelerometer is configured for output comparison for fault detection.

6. The seismic switch of claim 1, wherein:
the at least one accelerometer is further configured to measure an internal temperature of the seismic switch; and
the internal temperature indicates a fault when the internal temperature is outside of predetermined limits.

7. The seismic switch of claim 1, wherein the at least one accelerometer comprises a hardware pin connector enabling connection of an external logic analyzer for diagnosis and fault detection.

8. The seismic switch of claim 1, wherein:
the at least one accelerometer comprises a first accelerometer; and
the first accelerometer is powered by a 3.3 V power supply that is regulated down to a first 1.8 V power supply and a second 1.8 V power supply within the first accelerometer, the first 1.8 V power supply being provided to an analog circuit within the first accelerometer, the second 1.8 V power supply being provided to a digital circuit within the first accelerometer.

9. The seismic switch of claim 1, further comprising:
a fiber optic connector that couples the seismic switch to a seismic switch remote status (SSRS) display.

10. The seismic switch of claim 1, further comprising:
a deterministic real time operating system (RTOS) configured to perform safety functions in a period of time prior to performing non-safety functions.

11. The seismic switch of claim 1, further comprising:
a communication interface with a seismic switch remote status (SSRS) display configured to provide non-safety pre-fault monitoring,
wherein warnings are sent via the communication interface to the SSRS display prior to a complete fault shutdown of the seismic switch.

12. The seismic switch of claim 1, wherein the safety processor is further configured to perform at least one of:
detection of corrupted data in an analog-to-digital (ADC) data buffer; or
detection of calibration errors in the ADC data buffer.

13. The seismic switch of claim 1, wherein the second processor is further configured to detect internal power supply voltage errors.

14. The seismic switch of claim 1, wherein the second processor is further configured to detect out of tolerance output relay drive currents.

15. The seismic switch of claim 1, wherein the second processor is further configured to detect a stuck on output relay driver.

16. The seismic switch of claim 1, wherein the second processor is further configured to detect at least one of a corrupted power supply calibration or a corrupted configuration setting.

17. The seismic switch of claim 1, wherein the second processor is further configured to detect at least one of an out of tolerance main clock or an output of tolerance phase lock loop (PLL).

18. The seismic switch of claim 1, wherein the second processor is further configured to detect and correct 1 bit memory errors.

19. The seismic switch of claim 1, wherein the second processor is further configured to detect uncorrectable at least 2 bit memory errors.

20. A digital seismic switch, comprising:
a first processor;
a second processor, wherein the first processor and the second processor are configured to operate in lockstep and process identical data, and wherein the first and the second processor are configured to detect operational failure of the seismic switch in real time in response to a discrepancy between the first processor and the second processor;
at least one accelerometer configured to detect ground accelerations caused by seismic activity in a frequency range;
a plurality of peripheral components coupled to the first processor and the second processor, wherein each peripheral component of the plurality of peripheral components includes an error signaling component (ESM) configured to communicate fault associated with its respective peripheral component to the first and the second processors; and
a self-test controller (STC) configured to perform programmable hardware based test during normal system operations.

* * * * *